(12) United States Patent
Yamaga

(10) Patent No.: US 11,482,245 B2
(45) Date of Patent: Oct. 25, 2022

(54) TAPE-SHAPED MAGNETIC RECORDING MEDIUM INCLUDING MAGNETIC LAYER HAVING RECESSES ON A SURFACE, MAGNETIC RECORDING/REPRODUCING DEVICE, AND MAGNETIC RECORDING MEDIUM CARTRIDGE

(71) Applicant: Sony Corporation, Tokyo (JP)

(72) Inventor: Minoru Yamaga, Miyagi (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/649,461

(22) PCT Filed: Oct. 1, 2019

(86) PCT No.: PCT/JP2019/038785
§ 371 (c)(1),
(2) Date: Mar. 20, 2020

(87) PCT Pub. No.: WO2021/033333
PCT Pub. Date: Feb. 25, 2021

(65) Prior Publication Data
US 2022/0208221 A1 Jun. 30, 2022

(30) Foreign Application Priority Data
Aug. 20, 2019 (JP) ............................. JP2019-150696

(51) Int. Cl.
*G11B 5/17* (2006.01)
*G11B 5/73* (2006.01)
*G11B 5/78* (2006.01)

(52) U.S. Cl.
CPC ............ *G11B 5/17* (2013.01); *G11B 5/73911* (2019.05); *G11B 5/78* (2013.01)

(58) Field of Classification Search
CPC .......... G11B 5/17; G11B 5/73911; G11B 5/78
See application file for complete search history.

(56) References Cited

U.S. PATENT DOCUMENTS

| 7,029,774 B1* | 4/2006 | Greczyna ............. G11B 5/7358 |
| 2004/0072029 A1* | 4/2004 | Lowery ................. G11B 5/8404 427/127 |

(Continued)

FOREIGN PATENT DOCUMENTS

| JP | 2004005891 A | 1/2004 |
| JP | 2004273070 A | 9/2004 |

(Continued)

OTHER PUBLICATIONS

Notice of Reasons for Refusal dated Oct. 15, 2019 in corresponding Japanese Application No. 2019-150696.

(Continued)

*Primary Examiner* — Brian E Miller
(74) *Attorney, Agent, or Firm* — K&L Gates LLP

(57) ABSTRACT

A magnetic recording medium that can exhibit good traveling performance during use is provided. This magnetic recording medium is a tape-shaped magnetic recording medium, and includes a substrate, a base layer disposed on the substrate, and a magnetic layer disposed on the base layer. On the surface of the magnetic layer, recesses having a depth of 20% or more of the average thickness of the magnetic layer are formed at a ratio of 20 or more and 200 or less per 1600 μm². On the surface of the magnetic layer, a logarithmic decay rate determined by a pendulum viscoelasticity test at a temperature of 10° C. or higher and 45° C. or lower is 0.025 or more and 0.035 or less. A difference between a maximum value of the logarithmic decay rate and a minimum value of the logarithmic decay rate is 0 or more and 0.020 or less. The squareness ratio in the perpendicular direction is 65% or more. The average thickness of the magnetic layer is 80 nm or less. The average thickness of the magnetic recording medium is 5.6 μm or less.

13 Claims, 9 Drawing Sheets

(56) References Cited

U.S. PATENT DOCUMENTS

| | | | | |
|---|---|---|---|---|
| 2006/0263644 A1* | 11/2006 | Greczyna | | G11B 5/7358 |
| 2009/0134260 A1* | 5/2009 | Jensen | | G03B 1/04 |
| | | | | 242/324 |
| 2010/0106673 A1* | 4/2010 | Parks | | G06F 16/24575 |
| | | | | 706/50 |
| 2011/0229739 A1* | 9/2011 | Jensen | | G11B 5/70 |
| | | | | 428/846 |
| 2017/0053670 A1* | 2/2017 | Oyanagi | | G11B 5/7085 |
| 2018/0182425 A1* | 6/2018 | Kasada | | G11B 5/00813 |
| 2018/0240475 A1* | 8/2018 | Kasada | | G11B 5/7013 |
| 2018/0240476 A1* | 8/2018 | Kasada | | G11B 5/7013 |
| 2018/0240477 A1* | 8/2018 | Kasada | | G11B 5/70 |
| 2018/0240481 A1* | 8/2018 | Kasada | | G11B 5/70 |
| 2018/0240491 A1* | 8/2018 | Ozawa | | G11B 5/70 |
| 2019/0103131 A1* | 4/2019 | Kasada | | G11B 5/78 |
| 2019/0295587 A1* | 9/2019 | Kasada | | G11B 5/7085 |
| 2020/0279679 A1* | 9/2020 | Tsujimoto | | G11B 5/68 |
| 2021/0125634 A1* | 4/2021 | Yamaga | | G11B 5/7358 |

FOREIGN PATENT DOCUMENTS

| | | |
|---|---|---|
| JP | 2006-065953 | 3/2006 |
| JP | 2006-099919 | 4/2006 |
| JP | 2009-087468 | 4/2009 |
| JP | 2017-228328 | 12/2017 |
| JP | 2017-228333 | 12/2017 |
| WO | 2015/198514 | 12/2015 |

OTHER PUBLICATIONS

Decision to Grant a Patent dated Nov. 14, 2019 in corresponding Japanese Application No. 2019-150696.

* cited by examiner

TAPE-SHAPED MAGNETIC RECORDING MEDIUM INCLUDING MAGNETIC LAYER HAVING RECESSES ON A SURFACE, MAGNETIC RECORDING/REPRODUCING DEVICE, AND MAGNETIC RECORDING MEDIUM CARTRIDGE

TECHNICAL FIELD

The present disclosure relates to a magnetic recording medium, and a magnetic recording/reproducing device and a magnetic recording medium cartridge using the magnetic recording medium.

BACKGROUND ART

A tape-shaped magnetic recording medium is widely used for storing electronic data. For example, Patent Document 1 describes that a surface of a magnetic layer is smoothed in order to improve electromagnetic conversion characteristics of a magnetic recording medium. Furthermore, this document describes that a lubricant is added to the magnetic layer in order to suppress friction caused by contact between the magnetic recording medium and a head.

CITATION LIST

Patent Document

Patent Document 1: Japanese Patent Application Laid-Open No. 2006-65953

SUMMARY OF THE INVENTION

The tape-shaped magnetic recording medium is housed in, for example, a magnetic recording cartridge. In order to further increase the recording capacity per magnetic recording cartridge, it is considered to reduce the total thickness of the magnetic recording medium housed in the magnetic recording cartridge, and to increase the length of the magnetic recording medium per magnetic recording cartridge (so-called tape length). However, a magnetic recording medium having a small total thickness may have poor traveling stability. In particular, in a case where repeated recording and/or reproduction are/is performed, a magnetic recording medium having a small total thickness may change a surface state thereof (particularly, a surface state thereof related to friction), may deteriorate traveling stability thereof, and may further decrease electromagnetic conversion characteristics thereof.

Therefore, a magnetic recording medium having a small total thickness and excellent traveling stability is desired even after repeated recording and reproducing operations are performed.

A magnetic recording medium according to an embodiment of the present disclosure is a tape-shaped magnetic recording medium, and includes a substrate, a base layer disposed on the substrate, and a magnetic layer disposed on the base layer. On the surface of the magnetic layer, recesses having a depth of 20% or more of the average thickness of the magnetic layer are formed at a ratio of 20 or more and 200 or less per 1600 $\mu m^2$. On the surface of the magnetic layer, a logarithmic decay rate determined by a pendulum viscoelasticity test at a temperature of 10° C. or higher and 45° C. or lower is 0.025 or more and 0.035 or less. A difference between a maximum value of the logarithmic decay rate and a minimum value of the logarithmic decay rate is 0 or more and 0.020 or less. The squareness ratio in the perpendicular direction is 65% or more. The average thickness of the magnetic layer is 80 nm or less. The average thickness of the magnetic recording medium is 5.6 μm or less.

A magnetic recording/reproducing device according to an embodiment of the present disclosure includes a feeding unit that can sequentially feed out the magnetic recording medium described above, a winding unit that can wind up the magnetic recording medium fed out from the feeding unit, and a magnetic head that can write information on the magnetic recording medium and can read out information from the magnetic recording medium while being in contact with the magnetic recording medium traveling from the feeding unit toward the winding unit.

A magnetic recording medium cartridge according to an embodiment of the present disclosure includes the magnetic recording medium described above and a casing that houses the magnetic recording medium.

Since the magnetic recording medium, the magnetic recording/reproducing device, and the magnetic recording medium cartridge according to an embodiment of the present disclosure each have the above-described configuration, good contact between the surface of the magnetic layer and the head is maintained during traveling.

MODE FOR CARRYING OUT THE INVENTION

Hereinafter, an embodiment of the present disclosure will be described in detail with reference to the drawings. Note that the description will be made in the following order.

1. One embodiment
1-1. Configuration of magnetic recording medium
1-2. Method for manufacturing magnetic recording medium
1-3. Configuration of recording/reproducing device
1-4. Effect
2. Modification 1. One Embodiment

[1-1 Configuration of Magnetic Recording Medium 10]

Figure 1:
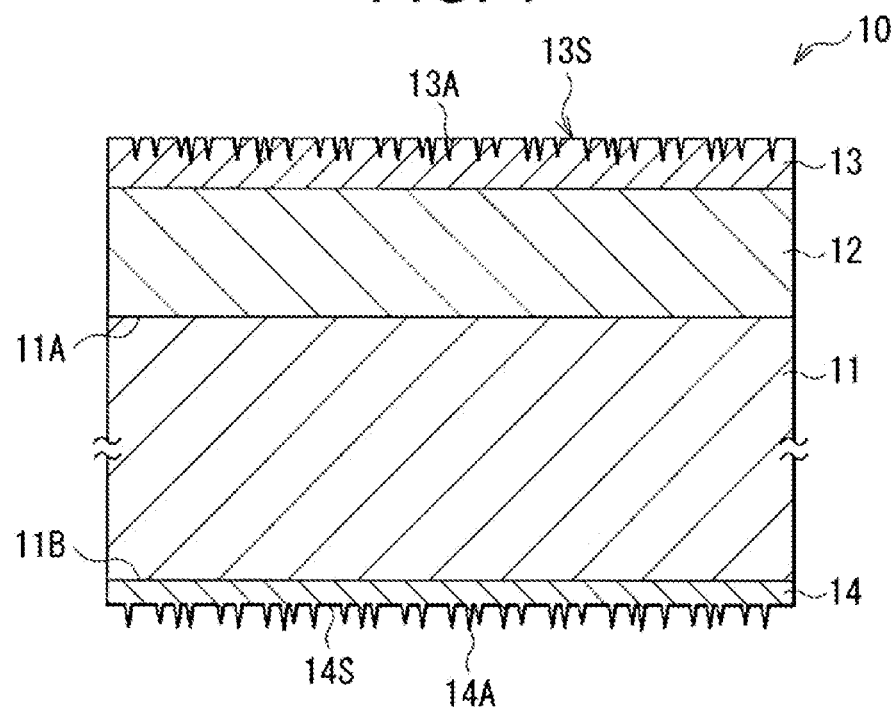
FIG. 1 is a cross-sectional view of a magnetic recording medium according to an embodiment of the present disclosure.

FIG. 1 illustrates a cross-sectional configuration example of a magnetic recording medium 10 according to an embodiment of the present disclosure. As illustrated in FIG. 1, the magnetic recording medium 10 has a laminated structure in which a plurality of layers is laminated. Specifically, the magnetic recording medium 10 includes a long tape-shaped substrate 11, a base layer 12 disposed on one main surface 11A of the substrate 11, a magnetic layer 13 disposed on the base layer 12, and a back layer 14 disposed on the other main surface 11B of the substrate 11. A surface 13S of the magnetic layer 13 is a surface on which a magnetic head travels while being in contact with the surface 13S. Note that the base layer 12 and the back layer 14 are disposed as necessary and may be omitted. Note that the average thickness of the magnetic recording medium 10 is preferably 5.6 µm or less, for example.

The magnetic recording medium 10 has a long tape shape, and travels in its own longitudinal direction during recording and reproducing operations. The magnetic recording medium 10 is preferably used for a recording/reproducing device including a ring type head as a recording head, for example.

(Substrate 11)

The substrate 11 is a nonmagnetic support for supporting the base layer 12 and the magnetic layer 13. The substrate 11 has a long film shape. An upper limit value of the average thickness of the substrate 11 is preferably 4.2 µm or less, and more preferably 4.0 µm or less. When the upper limit value of the average thickness of the substrate 11 is 4.2 µm or less, the recording capacity that can be recorded in one data cartridge can be increased as compared to a general magnetic recording medium. A lower limit value of the average thickness of the substrate 11 is preferably 3 µm or more, and more preferably 3.2 µm or more. When the lower limit value of the average thickness of the substrate 11 is 3 µm or more, a decrease in strength of the substrate 11 can be suppressed.

The average thickness of the substrate 11 is determined as follows. First, the magnetic recording medium 10 having a width of ½ inches is prepared and cut into a length of 250 mm to manufacture a sample. Subsequently, layers of the sample other than the substrate 11, that is, the base layer 12, the magnetic layer 13, and the back layer 14 are removed with a solvent such as methyl ethyl ketone (MEK) or dilute hydrochloric acid. Next, using a laser hologauge (LGH-110C) manufactured by Mitutoyo Corporation as a measuring device, the thickness of the substrate 11 as a sample is measured at five or more points. Thereafter, the measured values are simply averaged (arithmetically averaged) to calculate the average thickness of the substrate 11. Note that the measurement points are randomly selected from the sample.

The substrate 11 includes, for example, a polyester as a main component. Alternatively, the substrate 11 may include polyether ether ketone (PEEK) as a main component. The substrate 11 may include at least one of a polyolefin, a cellulose derivative, a vinyl-based resin, and another polymer resin in addition to a polyester or PEEK. In a case where the substrate 11 includes two or more of the materials described above, the two or more materials may be mixed, copolymerized, or laminated.

The polyester included in the substrate 11 includes, for example, at least one of polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), and polyethylene bisphenoxycarboxylate.

The polyolefin included in the substrate 11 includes, for example, at least one of polyethylene (PE) and polypropylene (PP). The cellulose derivative includes, for example, at least one of cellulose diacetate, cellulose triacetate, cellulose acetate butyrate (CAB), and cellulose acetate propionate (CAP). The vinyl-based resin includes, for example, at least one of polyvinyl chloride (PVC) and polyvinylidene chloride (PVDC).

The other polymer resin included in the substrate 11 includes, for example, at least one of polyamide or nylon (PA), aromatic polyamide or aramid (aromatic PA), polyimide (PI), aromatic polyimide (aromatic PI), polyamide imide (PAI), aromatic polyamide imide (aromatic PAI), polybenzoxazole (PBO) such as ZYLON (registered trademark), polyether, polyether ketone (PEK), polyether ester, polyether sulfone (PES), polyether imide (PEI), polysulfone (PSF), polyphenylene sulfide (PPS), polycarbonate (PC), polyarylate (PAR), and polyurethane (PU).

(Magnetic Layer 13)

The magnetic layer 13 is a recording layer for recording a signal. The magnetic layer 13 includes, for example, magnetic powder, a binder, and a lubricant. The magnetic layer 13 may further include an additive such as conductive particles, an abrasive, or a rust inhibitor as necessary.

The magnetic layer 13 has a surface 13S having a large number of recesses 13A. The large number of recesses 13A store a lubricant. The large number of recesses 13A preferably extend in a direction perpendicular to the surface of the magnetic layer 13. This is because a property of supplying the lubricant to the surface 13S of the magnetic layer 13 can be improved. Note that some of the large number of recesses 13A may extend in the perpendicular direction. Furthermore, on the surface 13S of the magnetic layer 13, the recesses 13A having a depth of 20% or more of the average thickness of the magnetic layer 13 are formed at a ratio of, for example, 20 or more and 200 or less, preferably 40 or more and 200 or less, more preferably 80 or more and 200 or less per 1600 µm$^2$.

The surface density of the recesses 13A on the surface 13S of the magnetic layer 13 is determined, for example, as follows. The surface 13S of the magnetic layer 13 is observed by AFM, and an AFM image of 40 μm×40 μm is obtained. As the AFM, Dimension 3100, Nano Scope IIIa manufactured by Digital Instruments and an analysis software thereof are used. A cantilever including a silicon single crystal (Note 1) is used. Measurement is performed by tuning at 200 to 400 Hz as a tapping frequency. Next, the AFM image is divided into 512×512 (=262,144) measurement points. The height Z(i) (i: measurement point number, i=1 to 262,144) is measured at each measurement point. The measured heights Z(i) at the measurement points are simply averaged (arithmetically averaged) to determine an average height (reference plane) $Z_{ave}$ (=Z(1)+Z(2)+ . . . +Z(262, 144))/262,144). In this case, as image processing, data that has been subjected to filtering processing by Flatten order 2 and plane fit order 3 XY is used as data.

Figure 2A:
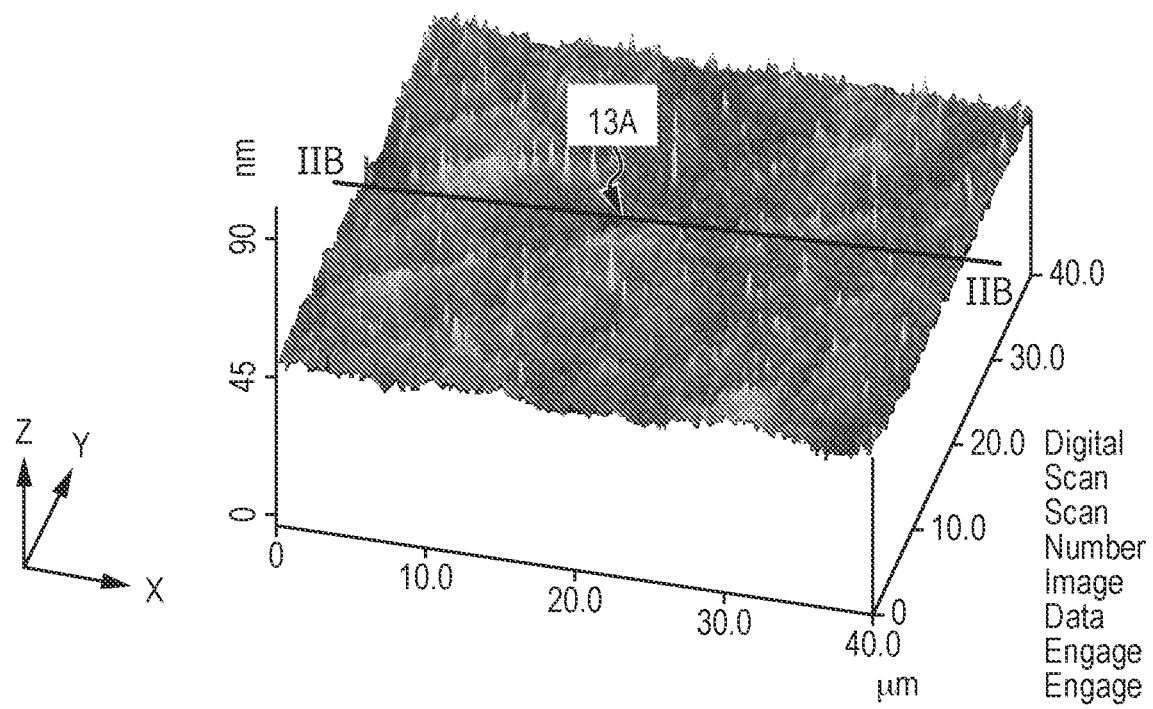
FIG. 2A is a first explanatory diagram illustrating a method for measuring the surface density of recesses in the magnetic recording medium illustrated in FIG. 1.
Figure 2B:
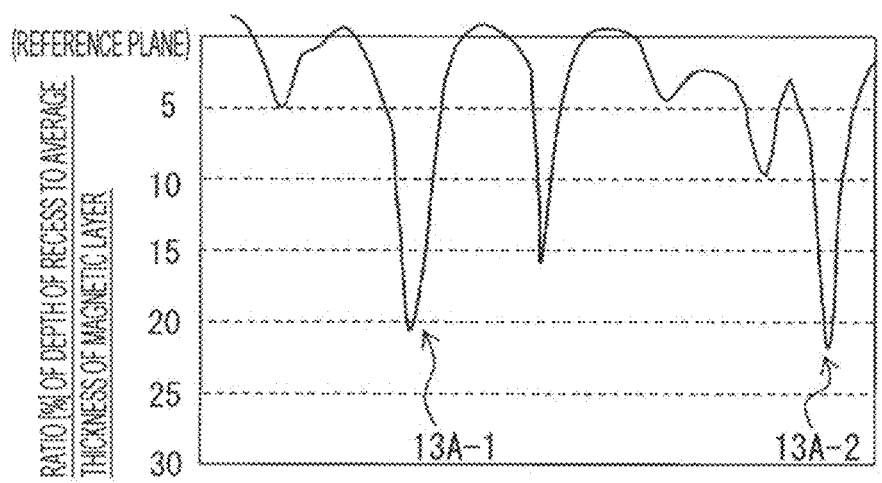
FIG. 2B is a second explanatory diagram illustrating a method for measuring the surface density of recesses in the magnetic recording medium illustrated in FIG. 1.
Figure 2C:
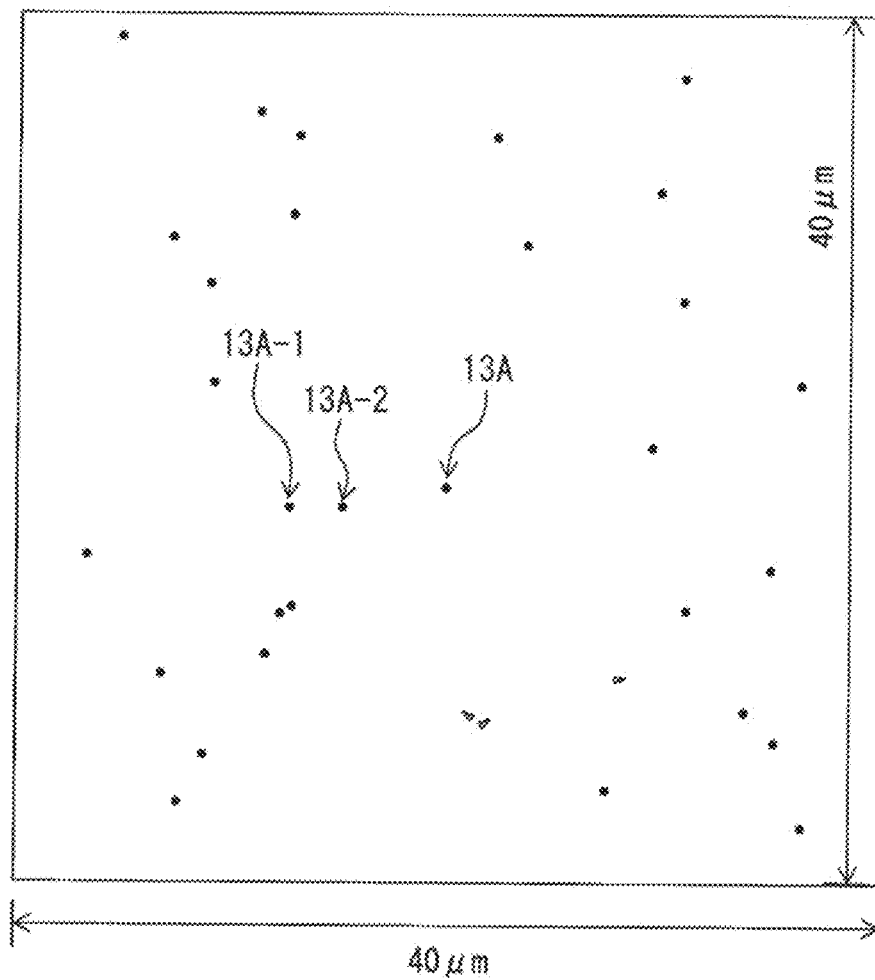
FIG. 2C is a third explanatory diagram illustrating a method for measuring the surface density of recesses in the magnetic recording medium illustrated in FIG. 1.

(Note 1) SPM probe NCH normal type Point Probe L (cantilever length)=125 μm manufactured by Nano World FIG. 2A illustrates an example of the surface 13S of the magnetic layer 13 observed in an enlarged manner. In FIG. 2A, the XY plane is a direction in which the surface 13S of the magnetic layer 13 extends, and is a region having a surface area of, for example, 40 μm×40 μm=1600 μm². Furthermore, in FIG. 2A, the Z-axis indicates the depth of the recess 13A. By counting the number of recesses 13A having a depth from the reference plane corresponding to 20% or more of the average thickness (for example, 70 nm) of the magnetic layer 13 in a region having a surface area of 40 μm×40 μm=1600 μm², the number is determined. FIG. 2B schematically illustrates a distribution of the plurality of recesses 13A in the region having a surface area of 1600 μm² illustrated in FIG. 2A. Specifically, a part of a cross section taken along the cut line IIB-IIB in FIG. 2A is illustrated. In FIG. 2B, the vertical axis corresponds to the depth of the recess 13A in the Z axis, and specifically indicates the ratio [%] of the depth of the recess 13A to the average thickness (for example, 70 nm) of the magnetic layer 13. In the cross section of FIG. 2B, the number of recesses 13A having a depth corresponding to 20% or more of the average thickness (for example, 70 nm) of the magnetic layer 13 is two, that is, recesses 13A-1 and 13A-2. FIG. 2C schematically illustrates a distribution of the plurality of recesses 13A in the region having a surface area of 1600 μm² illustrated in FIG. 2A. In the example illustrated in FIG. 2C, the number of recesses 13A having a depth corresponding to 20% or more of the average thickness (for example, 70 nm) of the magnetic layer 13 is 33. Note that the recess 13A illustrated in FIG. 2C corresponds to the recess 13A illustrated in FIG. 2A, and the recess 13A-1 and the recess 13A-2 illustrated in FIG. 2C correspond to the recess 13A-1 and the recess 13A-2 illustrated in FIG. 2B, respectively. Furthermore, as described later, the average thickness of the magnetic layer 13 is determined by thinly processing the magnetic recording medium 10 perpendicularly to a main surface thereof to manufacture a sample piece and observing a cross section of the test piece with a transmission electron microscope (TEM).

Figure 3A:
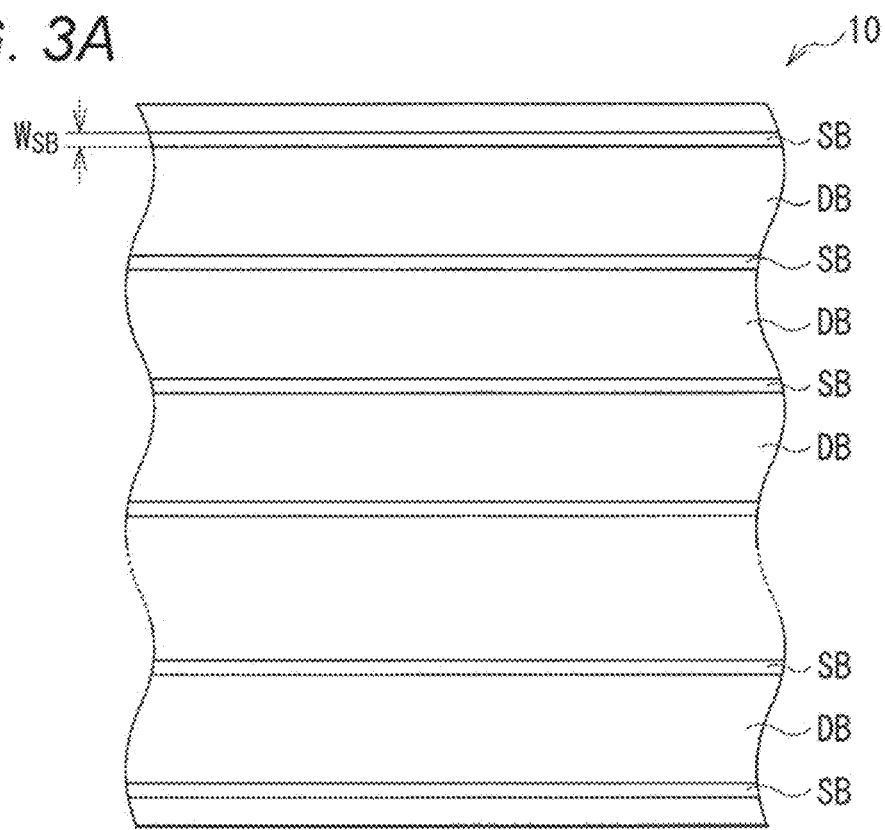
FIG. 3A is a schematic explanatory diagram illustrating a layout of data bands and servo bands in the magnetic recording medium illustrated in FIG. 1.

For example, as illustrated in FIG. 3A, the magnetic layer 13 preferably has a plurality of servo bands SB and a plurality of data bands DB in advance. FIG. 3A is a schematic explanatory diagram illustrating a layout of the data bands DB and the servo bands SB in the magnetic recording medium 10, and illustrates a layout in a plane orthogonal to a lamination direction in the magnetic recording medium 10 having a laminated structure. As illustrated in FIG. 2A, the plurality of servo bands SB is disposed at equal intervals in the width direction of the magnetic recording medium 10. The width direction of the magnetic recording medium 10 is a direction orthogonal to both a longitudinal direction of the magnetic recording medium 10 and the lamination direction thereof. A data band DB is disposed between adjacent servo bands SB in the width direction. In the servo band SB, a servo signal for performing tracking control of a magnetic head is written in advance. User data is recorded in the data band DB.

An upper limit value of a ratio $R_S$ (=($S_{SB}$/S)×100) of a total area $S_{SB}$ of the servo bands SB with respect to an area S of the surface 13S of the magnetic layer 13 is preferably 4.0% or less, more preferably 3.0% or less, and still more preferably 2.0% or less from a viewpoint of securing a high recording capacity. Meanwhile, a lower limit value of the ratio $R_S$ of the total area $S_{SB}$ of the servo bands SB with respect to the area S of the surface of the magnetic layer 13 is preferably 0.8% or more from a viewpoint of securing five or more servo tracks.

The ratio $R_S$ of the total area $S_{SB}$ of the servo bands SB with respect to the area S of the surface of the magnetic layer 13, the ratio $R_S$ of the total area $S_{SB}$ of the servo bands SB with respect to the area S of the surface of the magnetic layer 13 can be measured, for example, by developing the magnetic recording medium 10 using a ferricolloid developer (Sigmarker Q manufactured by Sigma Hi-Chemical Inc.) and then observing the developed magnetic recording medium 10 with an optical microscope. The servo band width $W_{SB}$ and the number of servo bands SB are measured from the observation image of the optical microscope. Next, the ratio $R_S$ is determined from the following formula.

Ratio $R_S$ [%]=(((servo bandwidth $W_{SB}$)×(number of servo bands))/(width of magnetic recording medium 10))×100

The number of servo bands SB is preferably 5 or more, and more preferably 5+4n (in which n is a positive integer) or more. When the number of servo bands SB is 5 or more, an influence on a servo signal due to a dimensional change of the magnetic recording medium 10 in a width direction thereof can be suppressed, and stable recording/reproducing characteristics with less off-track can be secured.

An upper limit value of the servo bandwidth $W_{SB}$ is preferably 95 μm or less, more preferably 60 μm or less, and still more preferably 30 μm or less from a viewpoint of securing a high recording capacity. A lower limit value of the servo bandwidth $W_{SB}$ is preferably 10 μm or more from a viewpoint of manufacturing a recording head. The width of the servo bandwidth $W_{SB}$ can be determined as follows. First, the magnetic recording medium 10 is developed using a ferricolloid developer (Sigmarker Q manufactured by Sigma Hi-Chemical Inc.). Next, the developed magnetic recording medium 10 is observed with an optical microscope, and the width of the servo bandwidth $W_{SB}$ can be thereby measured.

Figure 3B:
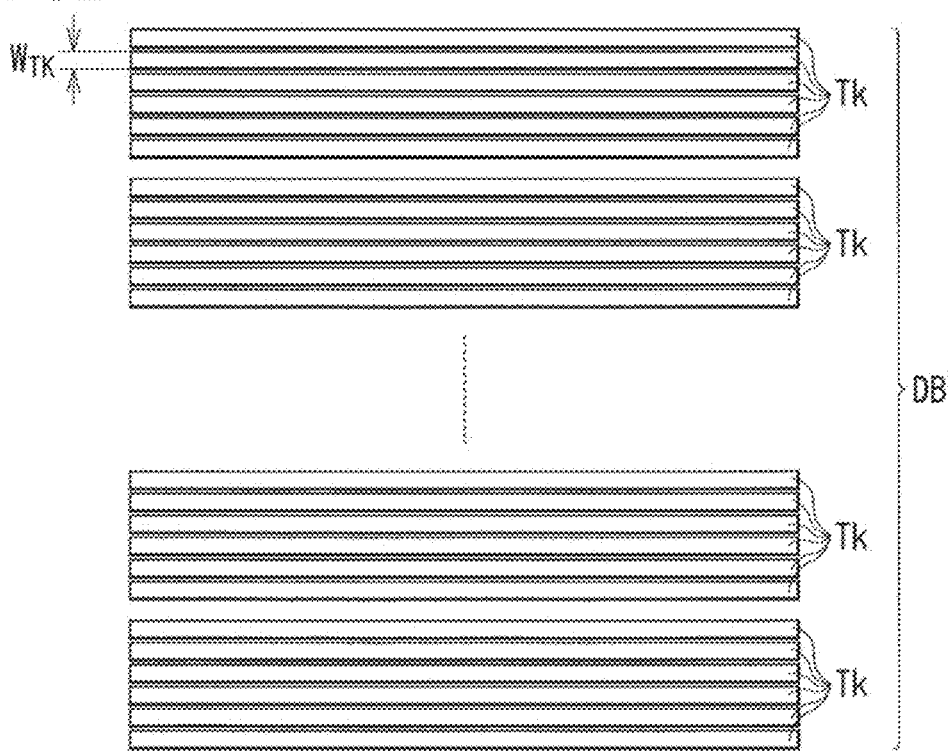
FIG. 3B is a schematic explanatory diagram illustrating one of the data bands illustrated in FIG. 3A in an enlarged manner.

As illustrated in FIG. 3B, the magnetic layer 13 can form a plurality of data tracks Tk in a data band DB. In this case, an upper limit value of the data track width WT is preferably 2.0 μm or less, more preferably 1.5 μm or less, and still more preferably 1.0 μm or less from a viewpoint of securing a high recording capacity. A lower limit value of the data track width WT is preferably 0.02 μm or more from a viewpoint of a magnetic particle size.

The magnetic layer 13 can record data such that the minimum value of a distance L between magnetization inversions is preferably 48 nm or less, more preferably 44 nm or less, and still more preferably 40 nm or less from a viewpoint of securing a high recording capacity. A lower limit value of the minimum value of the distance L between magnetization inversions is preferably 20 nm or more from a viewpoint of a magnetic particle size.

An upper limit value of the average thickness of the magnetic layer 13 is preferably 90 nm or less, particularly preferably 80 nm or less, more preferably 70 nm or less, and still more preferably 50 nm or less. When the upper limit value of the average thickness of the magnetic layer 13 is 90 nm or less, in a case where a ring type head is used as a recording head, magnetization can be recorded uniformly in the thickness direction of the magnetic layer 13, and therefore electromagnetic conversion characteristics can be improved.

A lower limit value of the average thickness of the magnetic layer 13 is preferably 35 nm or more. When the upper limit value of the average thickness of the magnetic layer 13 is 35 nm or more, output can be secured in a case where an MR type head is used as a reproducing head, and therefore electromagnetic conversion characteristics can be improved.

The average thickness of the magnetic layer 13 can be determined as follows. First, a carbon film is formed on the surface 13S of the magnetic layer 13 of the magnetic recording medium 10 and on a surface 14S of the back layer 14 thereof by a vapor deposition method. Thereafter, a tungsten thin film is further formed on the carbon film covering the surface 13S of the magnetic layer 13 by a vapor deposition method. The carbon film and tungsten film protect a sample in a thinning process described later.

Next, the magnetic recording medium 10 is processed to be thinned by a focused ion beam (FIB) method and the like. In a case where the FIB method is used, as a pretreatment for observing a TEM image of a cross section described later, a carbon film and a tungsten thin film are formed as protective films. The carbon film is formed on the magnetic layer side surface of the magnetic recording medium 10 and the back layer side surface thereof by a vapor deposition method, and the tungsten thin film is further formed on the magnetic layer side surface by a vapor deposition method or a sputtering method. The thinning is performed in a length direction (longitudinal direction) of the magnetic recording medium 10. That is, by the thinning, a cross section parallel to both the longitudinal direction of the magnetic recording medium 10 and the thickness direction thereof is formed. The cross section of the obtained thinned sample is observed with a transmission electron microscope (TEM) under the following conditions to obtain a TEM image. Note that the magnification and the acceleration voltage may be appropriately adjusted depending on the type of a device.

Device: TEM (H9000NAR manufactured by Hitachi, Ltd.)
Acceleration voltage: 300 kV
Magnification: 100,000 times Next, using the obtained TEM image, the thickness of the magnetic layer 13 is measured at ten or more points in the longitudinal direction of the magnetic recording medium 10. An average value obtained by simply averaging (arithmetically averaging) the obtained measured values is taken as the average thickness of the magnetic layer 13. Note that the positions where the measurement is performed are randomly selected from a test piece.

(Magnetic Powder)

The magnetic powder includes, for example, powder of a nanoparticle including ε iron oxide (hereinafter referred to as "ε iron oxide particle"). The ε iron oxide particle can obtain high coercive force even if the ε iron oxide particle is a fine particle. ε iron oxide included in the ε iron oxide particle is preferably crystal-oriented preferentially in a thickness direction (perpendicular direction) of the magnetic recording medium 10.

Figure 4:
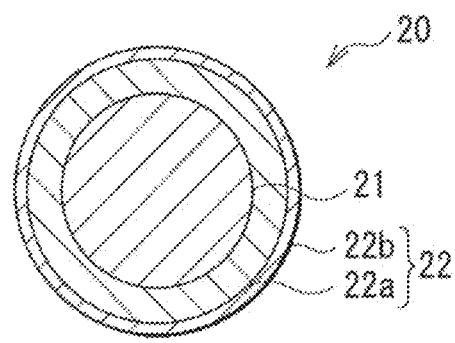
FIG. 4 is a cross-sectional view schematically illustrating a cross-sectional structure of an ε-iron oxide particle included in the magnetic layer illustrated in FIG. 1.

FIG. 4 is a cross-sectional view schematically illustrating an example of a cross-sectional structure of an P iron oxide particle 20 included in the magnetic layer 13. As illustrated in FIG. 4, the ε iron oxide particle 20 has a spherical shape or a substantially spherical shape, or has a cubic shape or a substantially cubic shape. Since the ε iron oxide particle 20 has the shape as described above, in a case where the ε iron oxide particle 20 is used as a magnetic particle, a contact area between the particles in the thickness direction of the magnetic recording medium 10 can be reduced, and aggregation of the particles can be suppressed as compared to a case where a hexagonal plate-shaped barium ferrite particle is used as the magnetic particle. Therefore, dispersibility of the magnetic powder can be enhanced, and a better signal-to-noise ratio (SNR) can be obtained.

The ε iron oxide particle 20 has, for example, a core-shell type structure. Specifically, as illustrated in FIG. 3, the ε iron oxide particle 20 has a core portion 21 and a two-layered shell portion 22 disposed around the core portion 21. The two-layered shell portion 22 includes a first shell portion 22a disposed on the core portion 21 and a second shell portion 22b disposed on the first shell portion 22a.

The core portion 21 in the E iron oxide particle 20 includes E iron oxide. E iron oxide included in the core portion 21 preferably includes an $\varepsilon$—$Fe_2O_3$ crystal as a main phase, and more preferably includes $\varepsilon$—$Fe_2O_3$ as a single phase.

The first shell portion 22a covers at least a part of the periphery of the core portion 21. Specifically, the first shell portion 22a may partially cover the periphery of the core portion 21 or may cover the entire periphery of the core portion 21. The first shell portion 22a preferably covers the entire surface of the core portion 21 from a viewpoint of making exchange coupling between the core portion 21 and the first shell portion 22a sufficient and improving magnetic characteristics.

The first shell portion 22a is a so-called soft magnetic layer, and includes, for example, a soft magnetic material such as α-Fe, a Ni—Fe alloy, or a Fe—Si—Al alloy. α-Fe may be obtained by reducing ε iron oxide included in the core portion 21.

The second shell portion 22b is an oxide film as an antioxidant layer. The second shell portion 22b includes a iron oxide, aluminum oxide, or silicon oxide. α-iron oxide includes, for example, at least one iron oxide of $Fe_3O_4$, $Fe_2O_3$, and FeO. In a case where the first shell portion 22a includes α-Fe (soft magnetic material), α-iron oxide may be obtained by oxidizing α-Fe included in the first shell portion 22a.

By inclusion of the first shell portion 22a in the ε iron oxide particle 20 as described above, a coercive force He of the entire ε iron oxide particle (core-shell particle) 20 can be adjusted to a coercive force He suitable for recording while a coercive force He of the core portion 21 alone is maintained at a large value in order to secure thermal stability. Furthermore, by inclusion of the second shell portion 22b in the ε iron oxide particle 20 as described above, it is possible to suppress deterioration of the characteristics of the ε iron oxide particle 20 due to generation of a rust and the like on a surface of the particle by exposure of the ε iron oxide particle 20 to the air during a step of manufacturing the magnetic recording medium 10 and before the step. Therefore, characteristic deterioration of the magnetic recording medium 10 can be suppressed by covering the first shell portion 22a with the second shell portion 22b.

The average particle size (average maximum particle size) of the magnetic powder is preferably 25 nm or less, more preferably 8 nm or more and 22 nm or less, and still more preferably 12 nm or more and 22 nm or less. In the magnetic recording medium 10, an area having a half size of a recording wavelength is an actual magnetization area. Therefore, by setting the average particle size of the magnetic powder to a half or less of the shortest recording wavelength, a good S/N can be obtained. Therefore, when the average particle size of the magnetic powder is 22 nm or less, in the magnetic recording medium 10 having a high recording density (for example, the magnetic recording medium 10 that can record a signal at the shortest recording wavelength of 50 nm or less), good electromagnetic conversion characteristics (for example, SNR) can be obtained. Meanwhile, when the average particle size of the magnetic powder is 8 nm or more, dispersibility of the magnetic powder is further improved, and better electromagnetic conversion characteristics (for example, SNR) can be obtained.

The magnetic powder has an average aspect ratio of preferably 1 or more and 3.0 or less, more preferably 1 or more and 2.8 or less, still more preferably 1 or more and 1.8 or less. When the average aspect ratio of the magnetic powder is within a range of 1 or more and 3.0 or less, aggregation of the magnetic powder can be suppressed, and resistance applied to the magnetic powder can be suppressed when the magnetic powder is vertically oriented in a step of forming the magnetic layer 13. Therefore, perpendicular orientation of the magnetic powder can be improved.

The average particle size and the average aspect ratio of the magnetic powder described above can be determined as follows. First, the magnetic recording medium 10 to be measured is processed to be thinned by a focused ion beam (FIB) method and the like. Thinning is performed in the length direction (longitudinal direction) of the magnetic tape. That is, this thinning forms a cross section parallel to both the longitudinal direction of the magnetic recording medium 10 and the thickness direction thereof. Cross-sectional observation is performed for the obtained thin sample such that the entire magnetic layer 13 is included with respect to the thickness direction of the magnetic layer 13 using a transmission electron microscope (H-9500 manufactured by Hitachi High-Technologies) with an acceleration voltage of 200 kV and an overall magnification of 500,000 times, and a TEM photograph is imaged.

Next, 50 particles are randomly selected from the imaged TEM photograph, and a long axis length DL and a short axis length DS of each of the particles are measured. Here, the long axis length DL means the largest distance among distances between two parallel lines drawn from all angles so as to come into contact with an outline of each of the particles (so-called maximum Feret diameter). Meanwhile, the short axis length DS means the largest length among the lengths of a particle in a direction orthogonal to the long axis length DL of the particle.

Subsequently, the measured long axis lengths DL of the 50 particles are simply averaged (arithmetically averaged) to determine an average long axis length DLave. The average long axis length DLave determined in this manner is taken as an average particle size of the magnetic powder. Furthermore, the measured short axis lengths DS of the 50 particles are simply averaged (arithmetically averaged) to determine an average short axis length DSave. Then, an average aspect ratio (DLave/DSave) of the particle is determined from the average long axis length DLave and the average short axis length DSave.

The average particle volume of the magnetic powder is preferably 5500 $nm^3$ or less, more preferably 270 $nm^3$ or more and 5500 $nm^3$ or less, and still more preferably 900 $nm^3$ or more and 5500 $nm^3$ or less. When the average particle volume of the magnetic powder is 5500 $nm^3$ or less, a similar effect to that in a case where the average particle size of the magnetic powder is 22 nm or less can be obtained. Meanwhile, when the average particle volume of the magnetic powder is 270 $nm^3$ or more, a similar effect to a case where the average particle size of the magnetic powder is 8 nm or more can be obtained.

In a case where the ε iron oxide particle 20 has a spherical shape or a substantially spherical shape, the average particle volume of the magnetic powder is determined as follows. First, an average long axis length DLave is determined in a similar manner to the above-described method for calculating the average particle size of the magnetic powder. Next, an average volume V of the magnetic powder is determined by the following formula.

$$V=(\pi/6)\times(DLave)^3$$

(Binder)

As the binder, a resin having a structure in which a crosslinking reaction is imparted to a polyurethane-based resin, a vinyl chloride-based resin, and the like is preferable. However, the binder is not limited to these resins, and other resins may be blended appropriately according to physical properties and the like required for the magnetic recording medium 10. Usually, a resin to be blended is not particularly limited as long as being generally used in the application type magnetic recording medium 10.

Examples of the resin to be blended include polyvinyl chloride, polyvinyl acetate, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinyl chloride-vinylidene chloride copolymer, a vinyl chloride-acrylonitrile copolymer, an acrylate-acrylonitrile copolymer, an acrylate-vinylidene chloride copolymer, a methacrylate-vinylidene chloride copolymer, a methacrylate-vinyl chloride copolymer, a methacryate-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, and nitrocellulose), a styrene-butadiene copolymer, a polyester resin, an amino resin, a synthetic rubber, and the like.

Furthermore, examples of a thermosetting resin or a reactive resin include a phenol resin, an epoxy resin, a urea resin, a melamine resin, an alkyd resin, a silicone resin, a polyamine resin, and a urea formaldehyde resin.

Furthermore, in order to improve dispersibility of the magnetic powder, a polar functional group such as —$SO_3M$, —$OSO_3M$, —COOM, or P=$O(OM)_2$ may be introduced into each of the above-described binders. Here, in the chemical formulas described above, M represents a hydrogen atom or an alkali metal such as lithium, potassium, or sodium.

Moreover, examples of the polar functional group include a side chain type group having a terminal group of —$NR1R2$ or —$NR1R2R3^+X^-$, and a main chain type group of >$NR1R2^+X^-$. Here, in the formulas described above, R1, R2, and R3 each represent a hydrogen atom or a hydrocarbon group, and $X^-$ represents an ion of a halogen element such as fluorine, chlorine, bromine, or iodine, or an inorganic or organic ion. Furthermore, examples of the polar functional group include —OH, —SH, —CN, and an epoxy group.

(Lubricant)

The lubricant included in the magnetic layer 13 includes, for example, a fatty acid and a fatty acid ester. The fatty acid included in the lubricant preferably includes, for example, at least one of a compound represented by the following general formula <1> and a compound represented by the general formula <2>. Furthermore, the fatty acid ester included in the lubricant preferably includes at least one of a compound represented by the following general formula <3> and a compound represented by the general formula <4>. By inclusion of two compounds of a compound represented by general formula <1> and a compound represented by general formula <3>, inclusion of two compounds of a compound represented by general formula <2> and a compound represented by general formula <3>, inclusion of two compounds of a compound represented by general formula <1> and a compound represented by general formula <4>, inclusion of two compounds of a compound represented by general formula <2> and a compound represented by general formula <4>, inclusion of three compounds of a compound represented by general formula <1>, a compound represented by general formula <2>, and a compound represented by general formula <3>, inclusion of three compounds of a compound represented by general formula <1>, a compound represented by general formula <2>, and a compound represented by general formula <4>, inclusion of three compounds of a compound represented by general formula <1>, a compound represented by general formula <3>, and a compound represented by general formula <4>, inclusion of three compounds of a compound represented by general formula <2>, a compound represented by general formula <3>, and a compound represented by general formula <4>, or inclusion of four compounds of a compound represented by general formula <1>, a compound represented by general formula <2>, a compound represented by general formula <3>, and a compound represented by general formula <4> in the lubricant, an increase in the coefficient of dynamic friction due to repeated recording or reproduction in the magnetic recording medium 10 can be suppressed. As a result, traveling performance of the magnetic recording medium 10 can be further improved.

$$CH_3(CH_2)_kCOOH \quad <1>$$

(Provided that in general formula <1>, k is an integer selected from a range of 14 or more and 22 or less, more preferably a range of 14 or more and 18 or less.)

$$CH_3(CH_2)_nCH=CH(CH_2)_mCOOH \quad <2>$$

(Provided that in general formula <2>, the sum of n and m is an integer selected from a range of 12 or more and 20 or less, more preferably a range of 14 or more and 18 or less.)

$$CH_3(CH_2)_pCOO(CH_2)_qCH_3 \quad <3>$$

(Provided that in general formula <3>, p is an integer selected from a range of 14 or more and 22 or less, more preferably a range of 14 or more and 18 or less, and q is an integer selected from a range of 2 or more and 5 or less, more preferably a range of 2 or more and 4 or less.)

$$CH_3(CH_2)_pCOO—(CH_2)_qCH(CH_3)_2 \quad <4>$$

(Provided that in the general formula <2>, p is an integer selected from a range of 14 or more and 22 or less, and q is an integer selected from a range of 1 or more and 3 or less.)

(Additive)

As nonmagnetic reinforcing particles, the magnetic layer 13 may further include aluminum oxide (α, β, or γ alumina), chromium oxide, silicon oxide, diamond, garnet, emery, boron nitride, titanium carbide, silicon carbide, titanium carbide, titanium oxide (rutile type or anatase type titanium oxide), and the like.

(Base Layer 12)

The base layer 12 is a nonmagnetic layer including nonmagnetic powder and a binder. The base layer 12 may further include at least one additive selected from a lubricant, conductive particles, a curing agent, a rust inhibitor, and the like as necessary. Furthermore, the base layer 12 may have a multi-layered structure formed by laminating a plurality of layers. An average thickness of the base layer 12 is preferably 0.5 μm or more and 0.9 μm or less, and more preferably 0.6 μm or more and 0.7 μm or less. By reducing the average thickness of the base layer 12 to 0.9 μm or less, the Young's modulus of the entire magnetic recording medium 10 is more effectively reduced than that in a case where the thickness of the substrate 11 is reduced. For this reason, tension control with respect to the magnetic recording medium 10 is easy. Furthermore, by setting the average thickness of the base layer 12 to 0.5 μm or more, adhesive force between the substrate 11 and the base layer 12 is secured. In addition, variations in the thickness of the base layer 12 can be suppressed, and an increase in the roughness of the surface 13S of the magnetic layer 13 can be prevented.

Note that the average thickness of the base layer 12 is obtained as follows, for example. First, the magnetic recording medium 10 having a width of ½ inches is prepared and cut into a length of 250 mm to manufacture a sample. Subsequently, in the magnetic recording medium 10 as the sample, the base layer 12 and the magnetic layer 13 are peeled off from the substrate 11. Next, using a laser hologauge (LGH-110C) manufactured by Mitutoyo Corporation as a measuring device, the thickness of a laminate of the base layer 12 and the magnetic layer 13 peeled off from the substrate 11 is measured at five or more points. Thereafter, the measured values are simply averaged (arithmetically averaged) to calculate the average thickness of the laminate of the base layer 12 and the magnetic layer 13. Note that the measurement points are randomly selected from the sample. Finally, the average thickness of the base layer 12 is determined by subtracting the average thickness of the magnetic layer 13 measured using TEM as described above from the average thickness of the laminate.

The base layer 12 preferably has a large number of holes. When the lubricant is stored in the large number of holes, even after recording or reproduction is performed repeatedly (that is, even after the magnetic recording medium 10 repeatedly travels while a magnetic head is in contact with a surface of the magnetic recording medium 10), it is possible to further suppress a decrease in the amount of a lubricant supplied to a space between the surface 13S of the magnetic layer 13 and the magnetic head. Therefore, an increase in the coefficient of dynamic friction can be further suppressed.

Holes of the base layer 12 are preferably connected to the recesses 13A of the magnetic layer 13 from a viewpoint of suppressing a decrease in the coefficient of dynamic friction after repeated recording or reproduction. Here, the state where the holes of the base layer 12 are connected to the recesses 13A of the magnetic layer 13 includes a state where some of the large number of holes of the base layer 12 are connected to some of the large number of recesses 13A of the magnetic layer 13.

The large number of holes preferably include those extending in a direction perpendicular to the surface 13S of the magnetic layer 13 from a viewpoint of improving a property of supplying the lubricant to the surface 13S of the magnetic layer 13. Furthermore, the holes of the base layer 12 extending in a direction perpendicular to the surface 13S of the magnetic layer 13 are preferably connected to the recesses 13A of the magnetic layer 13 extending in the direction perpendicular to the surface 13S of the magnetic layer 13 from a viewpoint of improving a property of supplying the lubricant to the surface 13S of the magnetic layer 13.

(Nonmagnetic Powder of Base Layer 12)

The nonmagnetic powder includes, for example, at least one of inorganic particle powder and organic particle powder. Furthermore, the nonmagnetic powder may include carbon powder such as carbon black. Note that one kind of nonmagnetic powder may be used singly, or two or more kinds of nonmagnetic powder may be used in combination. Examples of the inorganic powder include a metal, a metal oxide, a metal carbonate, a metal sulfate, a metal nitride, a metal carbide, a metal sulfide, and the like. Examples of the shape of the nonmagnetic powder include various shapes such as an acicular shape, a spherical shape, a cubic shape, and a plate shape, but are not limited thereto.

(Binder in Base Layer 12)

The binder in the base layer 12 is similar to that in the magnetic layer 13 described above.

(Back Layer 14)

The back layer 14 includes, for example, a binder and nonmagnetic powder. The back layer 14 may further include at least one additive selected from a lubricant, a curing agent, an antistatic agent, and the like as necessary. The binder and nonmagnetic powder in the back layer 14 are similar to those in the base layer 12 described above.

The nonmagnetic powder in the back layer 14 has an average particle size of preferably 10 nm or more and 150 nm or less, more preferably 15 nm or more and 110 nm or less. The average particle size of the nonmagnetic powder of the back layer 14 is determined in a similar manner to the average particle size of the magnetic powder in the magnetic layer 13 described above. The nonmagnetic powder may include those having a particle size distribution of 2 or more.

An upper limit value of the average thickness of the back layer 14 is preferably 0.6 μm or less, and particularly preferably 0.5 μm or less. When the upper limit value of the average thickness of the back layer 14 is 0.6 μm or less, even in a case where the average thickness of the magnetic recording medium 10 is 5.6 μm or less, the thicknesses of the base layer 12 and the substrate 11 can be kept thick. Therefore, traveling stability of the recording medium 10 in the recording/reproducing device can be maintained. The lower limit value of the average thickness of the back layer 14 is not particularly limited, but is, for example, 0.2 μm or more, and particularly preferably 0.3 μm or more.

The average thickness of the back layer 14 is determined as follows. First, the magnetic recording medium 10 having a width of ½ inches is prepared and cut into a length of 250 mm to manufacture a sample. Next, the thickness of the magnetic recording medium 10 as a sample is measured at five or more points using a laser hologage (LGH-110C) manufactured by Mitutoyo Corporation as a measuring device, and the measured values are simply averaged (arithmetically averaged) to calculate the average thickness $t_T$ [μm] of the magnetic recording medium 10. Note that the measurement points are randomly selected from the sample. Subsequently, the back layer 14 is removed from the magnetic recording medium 10 as a sample with a solvent such as methyl ethyl ketone (MEK) or dilute hydrochloric acid. Thereafter, using the laser hologauge described above again, the thickness of the sample obtained by removing the back layer 14 from the magnetic recording medium 10 is measured at five or more points, and these measured values are simply averaged (arithmetically averaged) to calculate the average thickness $t_B$ [μm] of the magnetic recording medium 10 from which the back layer 14 has been removed. Note that the measurement points are randomly selected from the sample. Finally, the average thickness $t_b$ [μm] of the back layer 14 is determined by the following formula.

$$t_b[\mu m]=t_T[\mu m]-t_B[\mu m]$$

As illustrated in FIG. 1, the back layer 14 has a surface having a large number of protrusions 14A. The large number of protrusions 14A are used for forming the large number of recesses 13A on the surface 13S of the magnetic layer 13 in a state where the magnetic recording medium 10 has been wound up in a roll shape. The large number of recesses 13A are formed by, for example, a large number of nonmagnetic particles protruding from a surface of the back layer 14.

(Average Thickness of Magnetic Recording Medium 10)

An upper limit value of the average thickness (average total thickness) of the magnetic recording medium 10 is preferably 5.6 μm or less, more preferably 5.0 μm or less, particularly preferably 4.6 μm or less, and still more preferably 4.4 μm or less. When the average thickness of the magnetic recording medium 10 is 5.6 μm or less, the recording capacity that can be recorded in one data cartridge can be increased as compared to a general magnetic recording medium. A lower limit value of the average thickness of the magnetic recording medium 10 is not particularly limited, but is, for example, 3.5 μm or more.

The average thickness $t_T$ of the magnetic recording medium 10 is obtained as follows. First, the magnetic recording medium 10 having a width of ½ inches is prepared and cut into a length of 250 mm to manufacture a sample. Next, the thickness of the sample is measured at five or more points using a laser hologage (LGH-110C) manufactured by Mitutoyo Corporation as a measuring device, and the measured values are simply averaged (arithmetically averaged) to calculate the average value $t_T$ [μm]. Note that the measurement points are randomly selected from the sample.

(Coercive Force Hc)

An upper limit value of the coercive force He of the magnetic recording medium 10 in a longitudinal direction thereof is preferably 2000 Oe or less, more preferably 1900 Oe or less, and still more preferably 1800 Oe or less. When the coercive force Hc2 in the longitudinal direction is 2000 Oe or less, magnetization reacts with high sensitivity due to a magnetic field in a perpendicular direction from a recording head. Therefore, a good recording pattern can be formed.

A lower limit value of the coercive force He measured in the longitudinal direction of the magnetic recording medium 10 is preferably 1000 Oe or more. When the lower limit value of the coercive force He in the longitudinal direction is 1000 Oe or more, demagnetization due to a leakage magnetic flux from a recording head can be suppressed.

The coercive force He described above is determined as follows. Three magnetic recording media 10 are overlapped and bonded with a double-sided tape, and then punched with a φ6.39 mm punch to manufacture a measurement sample. At this time, marking is performed with an arbitrary ink having no magnetism such that the longitudinal direction (traveling direction) of the magnetic recording medium can be recognized. Then, using a vibrating sample magnetometer (VSM), an M-H loop of the measurement sample (the entire magnetic recording medium 10) corresponding to the longitudinal direction of the magnetic recording medium 10 (traveling direction of the magnetic recording medium 10) is measured. Next, the coating film (the base layer 12, the magnetic layer 13, the back layer 14, and the like) is wiped off using acetone, ethanol, and the like, leaving only the substrate 11. Then, the three substrates 11 thus obtained are overlapped and bonded with a double-sided tape, and then punched with a φ6.39 mm punch to obtain a background correction sample (hereinafter simply referred to as a correction sample). Thereafter, an M-H loop of the correction sample (substrate 11) corresponding to the longitudinal direction of the substrate 11 (traveling direction of the magnetic recording medium 10) is measured using VSM.

In the measurement of the M-H loop of the measurement sample (the entire magnetic recording medium 10) and the M-H loop of the correction sample (substrate 11), for example, a favorably sensitive vibrating sample magnetometer "VSM-P7-15 type" manufactured by Toei Industry Co., Ltd. is used. The measurement conditions are set to measurement mode: full loop, maximum magnetic field: 15 kOe, magnetic field step: 40 bits, time constant of locking amp: 0.3 sec, waiting time: 1 sec, and MH average number: 20.

After the two M-H loops are obtained, the M-H loop of the correction sample (substrate 11) is subtracted from the M-H loop of the measurement sample (the entire magnetic recording medium 10) to perform background correction, and an M-H loop after background correction is obtained. For the calculation of background correction, a measurement/analysis program attached to "VSMP7-15 type" is used.

The coercive force Hc is determined from the obtained M-H loop after background correction. Note that for this calculation, a measurement/analysis program attached to "VSM-P7-15" is used. Note that each of the above measurements of the M-H loops is performed at 25° C. Furthermore, when the M-H loop is measured in the longitudinal direction of the magnetic recording medium 10, "demagnetizing field correction" is not performed.

(Squareness Ratio)

The magnetic recording medium 10 has a squareness ratio S1 of, for example, 65% or more, preferably 67% or more, more preferably 70% or more, still more preferably 75% or more, particularly preferably 80% or more in a perpendicular direction (thickness direction) of the magnetic recording medium 10. When the squareness ratio S1 is 65% or more, perpendicular orientation of magnetic powder is sufficiently high. Therefore, better SNR can be obtained.

The squareness ratio S1 is determined as follows. Three magnetic recording media 10 are overlapped and bonded with a double-sided tape, and then punched with a φ6.39 mm punch to manufacture a measurement sample. At this time, marking is performed with an arbitrary ink having no magnetism such that the longitudinal direction (traveling direction) of the magnetic recording medium can be recognized. Then, using a vibrating sample magnetometer (VSM), an M-H loop of the measurement sample (the entire magnetic recording medium 10) corresponding to the longitudinal direction of the magnetic recording medium 10 (traveling direction of the magnetic recording medium 10) is measured. Next, the coating film (the base layer 12, the magnetic layer 13, the back layer 14, and the like) is wiped off using acetone, ethanol, and the like, leaving only the substrate 11. Then, the three substrates 11 thus obtained are overlapped and bonded with a double-sided tape, and then punched with a φ6.39 mm punch to obtain a background correction sample (hereinafter simply referred to as a correction sample). Thereafter, an M-H loop of the correction sample (substrate 11) corresponding to the longitudinal direction of the substrate 11 (traveling direction of the magnetic recording medium 10) is measured using VSM.

In the measurement of the M-H loop of the measurement sample (the entire magnetic recording medium 10) and the M-H loop of the correction sample (substrate 11), for example, a favorably sensitive vibrating sample magnetometer "VSM-P7-15 type" manufactured by Toei Industry Co., Ltd. is used. The measurement conditions are set to measurement mode: full loop, maximum magnetic field: 15 kOe, magnetic field step: 40 bits, time constant of locking amp: 0.3 sec, waiting time: 1 sec, and MH average number: 20.

After the two M-H loops are obtained, the M-H loop of the correction sample (substrate 11) is subtracted from the M-H loop of the measurement sample (the entire magnetic recording medium 10) to perform background correction, and an M-H loop after background correction is obtained. For the calculation of background correction, a measurement/analysis program attached to "VSMP7-15 type" is used.

The squareness ratio S1 (%) is calculated by putting saturation magnetization Ms (emu) and residual magnetization Mr (emu) of the obtained M-H loop after background correction into the following formula.

$$\text{Squareness ratio} S1\ (\%) = (Mr/Ms) \times 100$$

Note that each of the above measurements of the M-H loops is performed at 25° C. Furthermore, when the M-H loop is measured in the perpendicular direction of the magnetic recording medium 10, "demagnetizing field correction" is not performed.

The magnetic recording medium 10 has a squareness ratio S2 of preferably 35% or less, more preferably 30% or less, still more preferably 25% or less, particularly preferably 20% or less, most preferably 15% or less in the longitudinal direction (traveling direction) of the magnetic recording medium 10. When the squareness ratio S2 is 35% or less, perpendicular orientation of magnetic powder is sufficiently high. Therefore, better SNR can be obtained.

The squareness ratio S2 is determined in a similar manner to the squareness ratio S1 except that the M-H loop is measured in the longitudinal direction (traveling direction) of the magnetic recording medium 10 and the substrate 11.

(SFD)

Figure 5:
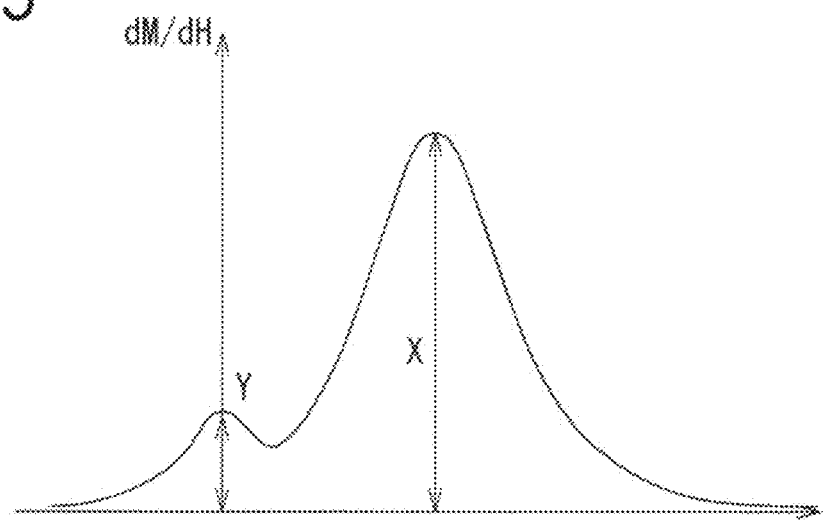
FIG. 5 is a graph illustrating an example of an SFD curve of the magnetic recording medium illustrated in FIG. 1.

In a switching field distribution (SFD) curve of the magnetic recording medium 10, a peak ratio X/Y between a height X of a main peak and a height Y of a sub-peak near the magnetic field zero is preferably 3.0 or more, more preferably 5.0 or more, still more preferably 7.0 or more, particularly preferably 10.0 or more, and most preferably 20.0 or more (refer to FIG. 5). When the peak ratio X/Y is 3.0 or more, it is possible to suppress inclusion of a large amount of low coercive force components unique to ε iron oxide (for example, soft magnetic particles, superparamagnetic particles, or the like) in magnetic powder in addition to the ε iron oxide particle 20 contributing to actual recording. Therefore, it is possible to suppress deterioration of a magnetization signal recorded in an adjacent track due to a leakage magnetic field from a recording head. Therefore, better SNR can be obtained. An upper limit value of the peak ratio X/Y is not particularly limited, but is for example, 100 or less.

The peak ratio X/Y described above is determined as follows. First, in a similar manner to the above method for measuring a coercive force Hc, an M-H loop after background correction is obtained. Next, an SFD curve is calculated from the obtained M-H loop. For calculating the SFD curve, a program attached to a measuring machine may be used, or another program may be used. By taking an absolute value of a point where the calculated SFD curve crosses the Y axis (dM/dH) as "Y" and taking the height of a main peak seen near a coercive force He in the M-H loop as "X", the peak ratio X/Y is calculated. Note that the M-H loop is measured at 25° C. in a similar manner to the above method for measuring a coercive force Hc. Furthermore, when the M-H loop is measured in the thickness direction (perpendicular direction) of the magnetic recording medium 10, "demagnetizing field correction" is not performed. Furthermore, according to the sensitivity of VSM used, a plurality of samples to be measured may be stacked on each other to measure the M-H loop.

(Activation Volume Vact)

An activation volume Vact is preferably 8000 nm$^3$ or less, more preferably 6000 nm$^3$ or less, still more preferably 5000 nm$^3$ or less, particularly preferably 4000 nm$^3$ or less, and most preferably 3000 nm$^3$ or less. When the activation volume Vact is 8000 nm$^3$ or less, a dispersed state of magnetic powder is good. Therefore, a bit inversion region can be made steep, and it is possible to suppress deterioration of a magnetization signal recorded in an adjacent track due to a leakage magnetic field from a recording head. Therefore, a better SNR can be obtained.

The activation volume Vact described above is determined by the following formula derived by Street & Woolley.

$$Vact\ (nm^3) = kB \times T \times Xirr / (\mu 0 \times Ms \times S)$$

(In which kB: Boltzmann's constant ($1.38 \times 10^{-23}$ J/K), T: temperature (K), Xirr: irreversible susceptibility, $\mu 0$: vacuum permeability, S: magnetic viscosity coefficient, Ms: saturation magnetization (emu/cm$^3$))

The irreversible susceptibility Xirr, the saturation magnetization Ms, and the magnetic viscosity coefficient S to be put in the above formula are determined using VSM as follows. A measurement sample used for VSM is manufactured by punching out a product obtained by overlapping three magnetic recording media 10 with a double-sided tape with a φ6.39 mm punch. At this time, marking is performed with an arbitrary ink having no magnetism such that the longitudinal direction (traveling direction) of the magnetic recording medium 10 can be recognized. Note that a measurement direction using VSM is the thickness direction (perpendicular direction) of the magnetic recording medium 10. Furthermore, the measurement using VSM is performed at 25° C. for a measurement sample cut out from the long magnetic recording medium 10. Furthermore, when the M-H loop is measured in the thickness direction (perpendicular direction) of the magnetic recording medium 10, "demagnetizing field correction" is not performed. Moreover, in the measurement of the M-H loop of the measurement sample (the entire magnetic recording medium 10) and the M-H loop of the correction sample (substrate 11), a highly sensitive vibrating sample magnetometer "VSM-P7-15 type" manufactured by Toei Industry Co., Ltd. is used. The measurement conditions are set to measurement mode: full loop, maximum magnetic field: 15 kOe, magnetic field step: 40 bits, time constant of locking amp: 0.3 sec, waiting time: 1 sec, and MH average number: 20.

(Irreversible Susceptibility Xirr)

The irreversible susceptibility Xirr is defined as an inclination near a residual coercive force Hr in the inclination of a residual magnetization curve (DCD curve). First, a magnetic field of −1193 kA/m (15 kOe) is applied to the entire magnetic recording medium 10, and the magnetic field is returned to zero to obtain a residual magnetization state. Thereafter, a magnetic field of about 15.9 kA/m (200 Oe) is applied in the opposite direction to return the magnetic field to zero again, and a residual magnetization amount is measured. Thereafter, similarly, measurement of applying a magnetic field larger than the previously applied magnetic field by 15.9 kA/m to return the magnetic field to zero is repeated, and a residual magnetization amount is plotted with respect to an applied magnetic field to form a DCD curve. From the obtained DCD curve, a point where the magnetization amount is zero is taken as a residual coercive force Hr, the DCD curve is differentiated, and the inclination of the DCD curve at each magnetic field is determined. In the inclination of this DCD curve, an inclination near the residual coercive force Hr is Xirr.

(Saturation Magnetization Ms)

First, in a similar manner to the above method for measuring a coercive force Hc, an M-H loop after background correction is obtained. Next, Ms (emu/cm$^3$) is calculated from a value of saturation magnetization Ms (emu) of the obtained M-H loop and the volume (cm$^3$) of the magnetic layer 13 in the measurement sample. Note that the volume of the magnetic layer 13 is determined by multiplying the area of the measurement sample by an average thickness of the magnetic layer 13. The method for calculating the average thickness of the magnetic layer 13 necessary for calculating the volume of the magnetic layer 13 is as described above.

(Magnetic Viscosity Coefficient S)

First, a magnetic field of −1193 kA/m (15 kOe) is applied to the entire magnetic recording medium 10 (measurement sample), and the magnetic field is returned to zero to obtain a residual magnetization state. Thereafter, a magnetic field equivalent to the value of the residual coercive force Hr obtained from the DCD curve is applied in the opposite direction. A magnetization amount is continuously measured at constant time intervals for 1000 seconds in a state where a magnetic field is applied. A magnetic viscosity coefficient S is calculated by comparing a relationship between time t and a magnetization amount M(t), obtained in this way, with the following formula.

$$M(t) = M0 + S \times \ln(t)$$

(In which M(t): magnetization amount at time t, M0: initial magnetization amount, S: magnetic viscosity coefficient, ln(t): natural logarithm of time)

(Friction Coefficient Ratio ($\mu_B/\mu_A$))

The magnetic recording medium 10 has a friction coefficient ratio ($\mu_B/\mu_A$) of preferably 1.0 or more and 2.0 or less, more preferably 1.0 or more and 1.8 or less, still more preferably 1.0 or more and 1.6 or less, in which A represents a coefficient of dynamic friction between the surface 13S of the magnetic layer 13 of the magnetic recording medium 10 and a magnetic head in a state where a tension of 0.4 N is applied to the magnetic recording medium 10 in a longitudinal direction thereof, and B represents a coefficient of dynamic friction between the surface 13S of the magnetic layer 13 of the magnetic recording medium 10 and the magnetic head in a state where a tension of 1.2 N is applied to the magnetic recording medium 10 in the longitudinal direction. The friction coefficient ratio ($\mu_B/\mu_A$) within the above numerical range can reduce a change in the coefficient of dynamic friction due to the tension fluctuation during traveling, and therefore can stabilize traveling of the magnetic recording medium 10.

Figure 8:
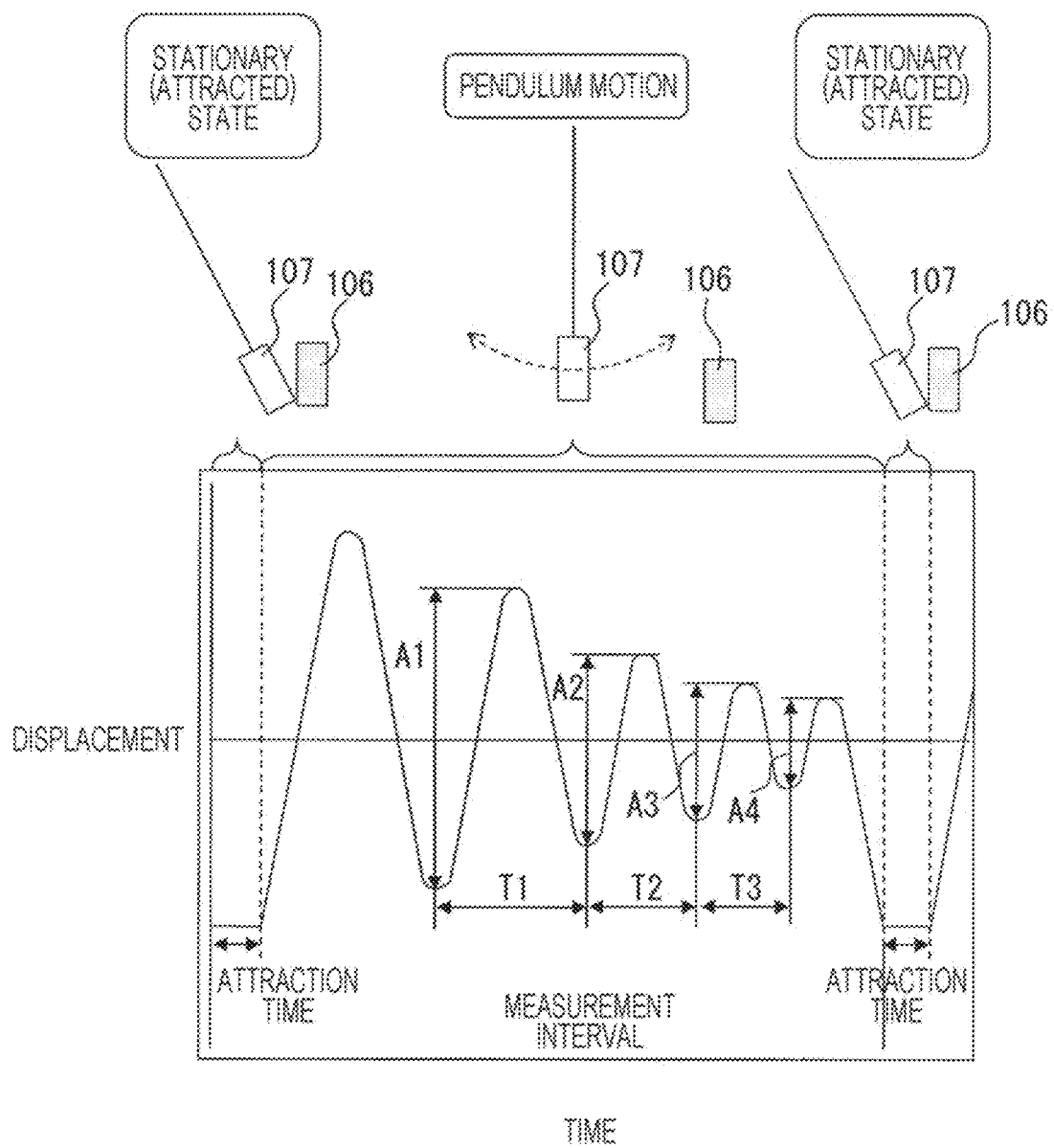
FIG. 8 is a third explanatory diagram of the method for measuring a logarithmic decay rate by a pendulum viscoelasticity test.

The coefficient of dynamic friction µA and the coefficient of dynamic friction µB for calculating the friction coefficient ratio (µB/µA) are determined as follows. First, as illustrated in FIG. 8, the magnetic recording medium 10 with a width of ½ inches is placed on two cylindrical guide rolls 91 and 92 with a diameter of one inch disposed in parallel to and spaced apart from each other such that the surface 13S of the magnetic layer 13 is in contact with the guide rolls 91 and 92. The two guide rolls 91 and 92 have a fixed positional relationship with each other.

Subsequently, the magnetic recording medium 10 is brought into contact with a head block (for recording/reproducing) 93 mounted on an LTO5 drive such that the surface 13S of the magnetic layer 13 is in contact with the head block 93 and a holding angle θ1 [°] is 5.6°. One end of the magnetic recording medium 10 is held by a gripping jig 94 and connected to a movable strain gauge 95, and a weight 96 is suspended from the other end of the magnetic recording medium 10 to apply a tension T0 of 0.4 N. Note that the head block 93 is fixed at a position where the holding angle θ1 [°] is 5.6°. As a result, the positional relationship between the guide rolls 91 and 92 and the head block 93 is also fixed.

Subsequently, the magnetic recording medium 10 is slid by 60 mm toward the movable strain gauge 95 at a speed of 10 mm/s with respect to the head block 93 by the movable strain gauge 95. An output value (voltage) of the movable strain gauge 95 at the time of sliding is converted into T [N] on the basis of a linear relationship (described later) between an output value acquired in advance and a load. T [N] is acquired 13 times from the start of sliding to the end of sliding for the 60 mm slide described above, and 11 values of T [N] excluding totally two times of the first and last times are simply averaged to obtain $T_{ave}$ [N].

Thereafter, the coefficient of dynamic friction $\mu_A$ is determined by the following formula.

$$\mu_A = \frac{1}{(\theta_1[°]) \times (\prod/180)} \times \ln\left(\frac{T_{ave}[N]}{T_0[N]}\right) \quad \text{[Numerical Formula 1]}$$

The linear relationship described above is obtained as follows. That is, an output value (voltage) of the movable strain gauge 95 is obtained for each of cases where a load of 0.4 N is applied to the movable strain gauge 95 and a load of 1.5 N is applied thereto. From the obtained two output values and the two loads, a linear relationship between the output value and the load is obtained. Using the linear relationship, as described above, the output value (voltage) from the movable strain gauge 95 during sliding is converted into T [N].

The coefficient of dynamic friction $\mu_B$ is measured by the same method as the method for measuring the coefficient of dynamic friction $\mu_A$ except that the tension $T_0$ [N] applied to the other end is set to 1.2 N.

The friction coefficient ratio ($\mu_B/\mu_A$) is calculated from the coefficient of dynamic friction $\mu_A$ and the coefficient of dynamic friction a measured as described above.

In a case where the coefficient of dynamic friction between the surface 13S of the magnetic layer 13 and the magnetic head is represented by C when a tension of 0.6 N is applied to the magnetic recording medium 10, a friction coefficient ratio (µC(1000)/µC(5)) between the fifth coefficient of dynamic friction µC (5) from the start of travel and the 1000th coefficient of dynamic friction µC (1000) from the start of travel is preferably 1.0 or more and 1.9 or less, and more preferably 1.2 or more and 1.8 or less. When the friction coefficient ratio (µC(1000)/µC(5)) is 1.0 or more and 1.9 or less, a change in the coefficient of dynamic friction due to traveling many times can be reduced, and therefore traveling of the magnetic recording medium 10 can be stabilized. Here, a magnetic head with a drive corresponding to the magnetic recording medium 10 is used as the magnetic head.

(Friction Coefficient Ratio ($\mu_{C(1000)}/\mu_{C(5)}$))

The coefficient of dynamic friction µC(5) and the coefficient of dynamic friction µC(1000) for calculating the friction coefficient ratio (µC(1000)/µC(5)) are determined as follows.

The magnetic recording medium 10 has the friction coefficient ratio ($\mu_{C(1000)}/\mu_{C(5)}$) of preferably 1.0 to 2.0, more preferably 1.0 to 1.8, still more preferably 1.0 to 1.6, in which the friction coefficient ratio ($\mu_{C(1000)}/\mu_{C(5)}$) represents a friction coefficient ratio between the coefficient of dynamic friction c(s) at the fifth reciprocation in a case where the magnetic recording medium in a state where a tension of 0.6 N is applied to the magnetic recording medium 10 in a longitudinal direction thereof is reciprocatedly slid five times on a magnetic head and the coefficient of dynamic friction $\mu_{C(1000)}$ at the 1000th reciprocation in a case where the magnetic recording medium 10 is reciprocated 1000 times on the magnetic head. The friction coefficient ratio ($\mu_{C(1000)}/\mu_{C(5)}$) within the above numerical range can reduce a change in the coefficient of dynamic friction due to traveling many times, and therefore can stabilize traveling of the magnetic recording medium 10.

The coefficient of dynamic friction c(s) and the coefficient of dynamic friction $\mu_{C(1000)}$ for calculating the friction coefficient ratio ($\mu_{C(1000)}/\mu_{C(5)}$) are determined as follows.

The magnetic recording medium 10 is connected to a movable strain gauge 71 in the same manner as the method for measuring the coefficient of dynamic friction $\mu_A$ except that the tension $T_0$ [N] applied to the other end of the magnetic recording medium 10 is set to 0.6 N.

Then, the magnetic recording medium 10 is slid 60 mm toward the movable strain gauge at 10 mm/s with respect to the head block 74 (forward path) and slid 60 mm away from the movable strain gauge (return path). This reciprocating operation is repeated 1000 times. Among the 1000 reciprocating operations, a strain gauge output value (voltage) is acquired 13 times from the start of sliding to the end of sliding for the 60 mm slide in the fifth forward path, and the output value is converted into T [N] on the basis of a linear relationship between an output value determined for the coefficient of dynamic friction $\mu_A$ and a load. Eleven values of T [N] excluding totally two times of the first and last times are simply averaged to determine $T_{ave}$ [N]. According to the following formula, the coefficient of dynamic friction $\mu_{C(5)}$ is determined.

$$\mu_{C(5)} = \frac{1}{(\theta_1[°]) \times (\prod/180)} \times \ln\left(\frac{T_{ave}[N]}{T_0[N]}\right) \quad \text{[Numerical Formula 2]}$$

Moreover, the coefficient of dynamic friction $\mu_{C(1000)}$ is determined in a similar manner to the coefficient of dynamic friction $\mu_{C(5)}$ except that measurement is performed for the 1000th forward path.

The friction coefficient ratio $\mu_{C(1000)}/\mu_{C(5)}$ is calculated from the coefficient of dynamic friction $\mu_{C(5)}$ and the coefficient of dynamic friction $\mu_{C(1000)}$ measured as described above.

(Logarithmic Decay Rate Determined by Pendulum Viscoelasticity Test)

On the surface 13S of the magnetic layer 13, a logarithmic decay rate determined by a pendulum viscoelasticity test (hereinafter, simply referred to as logarithmic decay rate) is 0.025 or more and 0.035 or less at a temperature of 10° C. or higher and 45° C. or lower. Furthermore, at a temperature of 10° C. or higher and 45° C. or lower, a difference between a maximum value of the logarithmic decay rate and a minimum value of the logarithmic decay rate is 0 or more and 0.020 or less. Here, as the logarithmic decay rate is higher, the viscosity is higher, and as the logarithmic decay rate is lower, the elasticity is stronger. Note that the temperature range of 10° C. or higher and 45° C. or lower is a temperature range in which use of the magnetic recording medium 10 is normally assumed. By optimizing the viscoelasticity of the surface 13S of the magnetic layer 13 in such a temperature range, powdering of a constituent material itself of the magnetic layer 13, which is sometimes referred to as so-called powder falling, is suppressed. As a result, during the recording operation and/or the reproducing operation of the magnetic recording medium 10, a contact between the magnetic head and a surface of the magnetic layer can be maintained well and stably.

Figure 6:
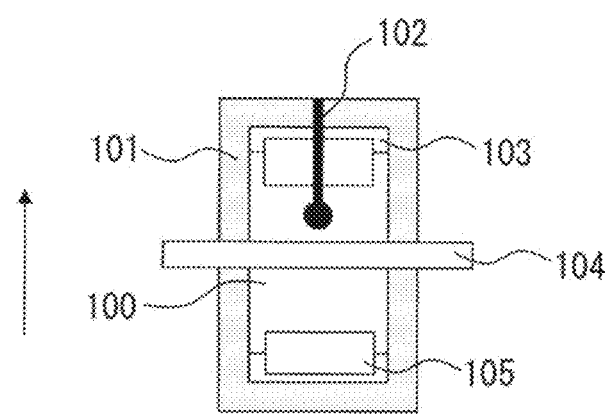
FIG. 6 is a first explanatory diagram of a method for measuring a logarithmic decay rate by a pendulum viscoelasticity test.
Figure 7:
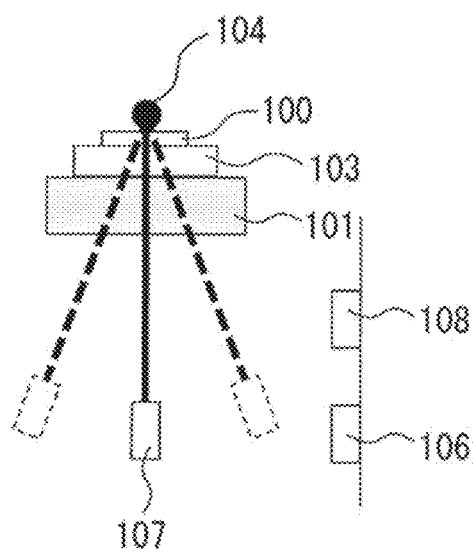
FIG. 7 is a second explanatory diagram of the method for measuring a logarithmic decay rate by a pendulum viscoelasticity test.

The logarithmic decay rate described above is a value determined by the following method using, for example, a pendulum viscoelasticity tester. As the pendulum viscoelasticity tester, for example, a rigid pendulum type physical property tester RPT-3000W manufactured by A & D can be used. FIGS. 6 to 8 are first to third explanatory diagrams of a method for measuring the logarithmic decay rate by a pendulum viscoelasticity test. Hereinafter, a method for measuring the logarithmic decay rate will be described with reference to these drawings. However, the illustrated embodiment is an exemplification, and does not limit the present disclosure at all.

A tape having a length of 25 mm and a width of ½ inches is cut out as a measurement sample 100 from the magnetic recording medium 10 to be measured. The measurement sample 100 thus cut out is placed on a basal plate 103 with a measurement surface (the surface 13S of the magnetic layer 13) upward on a sample stage 101 in a pendulum viscoelasticity tester, and is fixed with a Kapton tape 105 in a state where there is not a clear wrinkle that can be visually confirmed.

Next, a cylindrical cylinder edge 104 with a pendulum having a mass of 13 g (diameter 4 mm) is placed on the measurement surface of the measurement sample 100 such that the major axis direction of the cylinder edge 104 is perpendicular to the longitudinal direction of the measurement sample 100. FIG. 6 illustrates an example of a state where the cylindrical cylinder edge 104 with a pendulum is placed on the measurement surface of the measurement sample 100 (as viewed from above). In the embodiment illustrated in FIG. 6, a temperature sensor 102 is placed on a tape such that the temperature of the tape can be measured, and the surface temperature of the basal plate 103 can be monitored. Note that in the embodiment illustrated in FIG. 6, the longitudinal direction of the measurement sample 100 is the direction indicated by the arrow in the drawing, and refers to the longitudinal direction of the magnetic recording medium 10 from which the measurement sample 100 has been cut out. In the present disclosure, "perpendicular" includes a range of errors allowed in the technical field to which the present disclosure belongs. The above range of the errors means, for example, a range of less than ±100 with respect to a strict perpendicular direction. Furthermore, as a pendulum 107 (see FIG. 7), a pendulum including a material (for example, including a metal, an alloy, or the like) having a property of being attracted by a magnet is used.

By releasing attraction of the pendulum 107 to a magnet 106 while the surface temperature of the basal plate 103 on which the measurement sample 100 is placed is raised from 0° C. to 50° C. at a temperature rising rate of 2.5° C./min or less, a pendulum motion is started (initial vibration is induced). FIG. 7 illustrates an example of a state of the pendulum 107 that is performing a pendulum motion (a state viewed from a side). In the embodiment illustrated in FIG. 7, in the pendulum viscoelasticity tester, by stopping energization to the magnet (electromagnet) 106 disposed below the sample stage (turning off the switch) to release the attraction, a pendulum motion is started, and by resuming energization to the electromagnet (turning on the switch) and causing the pendulum 107 to be attracted to the magnet 106, the pendulum motion is stopped. During the pendulum motion, the pendulum 107 repeats the amplitude as illustrated in FIG. 7. From the result obtained by monitoring displacement of the pendulum by a displacement sensor 108 while the pendulum repeats the amplitude, a displacement-time curve is obtained in which the displacement is plotted on the vertical axis and the elapsed time is plotted on the horizontal axis. An example of the displacement-time curve is illustrated in FIG. 8. FIG. 8 schematically illustrates correspondence between the state of the pendulum 107 and the displacement-time curve. A stationary (attracted) state and a pendulum motion are repeated at a fixed measurement interval. Using the obtained displacement-time curve, a logarithmic decay rate Δ (unitless) is determined from the following formula. This value is used as the logarithmic decay rate of the surface 13S of the magnetic layer 13 of the magnetic recording medium 10. Attraction time for one attraction is set to one second or more (may be any time as long as the time is one second or more), and an interval from an end of attraction to start of the subsequent attraction is set to six seconds or more (may be any time as long as the time is six seconds or more). The measurement interval is a time interval from start of attraction to start of the subsequent attraction. Furthermore, the humidity of an environment where the pendulum motion is performed may be any relative humidity as long as the relative humidity is within a range of 40 to 70%.

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$ [Numerical Formula 3]

In the displacement-time curve, an interval from a point where the displacement is minimum to a point where the displacement is minimum again is defined as one wave period. n is defined as the number of waves included in the displacement-time curve during the measurement interval, and An is defined as a difference between the minimum displacement and the maximum displacement in the n-th wave. In FIG. 8, an interval from a point where the displacement of the n-th wave is minimum to a point where the displacement of the n-th wave is minimum again is represented by Tn (for example, T1 for the first wave, T2 for the second wave, and T3 for the third wave). In calculating the logarithmic decay rate, a difference between a minimum displacement and a maximum displacement appearing after the n-th wave (An+1 in the above formula 1, A4 in the displacement-time curve illustrated in FIG. 8) is also used.

However, a portion where the pendulum 107 is stationary (attracted) after the maximum is not used for counting the number of waves. Furthermore, a portion where the pendulum 107 is stationary (attracted) before the maximum displacement is not used for counting the number of waves. Therefore, in the displacement-time curve illustrated in FIG. 8, the number of waves is three (n=3).

[1-2 Method for Manufacturing Magnetic Recording Medium 10]

Next, a method for manufacturing the magnetic recording medium 10 having the above-described configuration will be described. First, by kneading and dispersing nonmagnetic powder, a binder, a lubricant, and the like in a solvent, a base layer forming coating material is prepared. Next, by kneading and dispersing magnetic powder, a binder, a lubricant, and the like in a solvent, a magnetic layer forming coating material is prepared. Next, by kneading and dispersing a binder, nonmagnetic powder, and the like in a solvent, a back layer forming coating material is prepared. For preparing the magnetic layer forming coating material, the base layer forming coating material, and the back layer forming coating material, for example, the following solvents, dispersing devices, and kneading devices can be used.

Examples of the solvent used for preparing the above-described coating material include a ketone-based solvent such as acetone, methyl ethyl ketone, methyl isobutyl ketone, or cyclohexanone, an alcohol-based solvent such as methanol, ethanol, or propanol, an ester-based solvent such as methyl acetate, ethyl acetate, butyl acetate, propyl acetate, ethyl lactate, or ethylene glycol acetate, an ether-based solvent such as diethylene glycol dimethyl ether, 2-ethoxyethanol, tetrahydrofuran, or dioxane, an aromatic hydrocarbon-based solvent such as benzene, toluene, or xylene, a halogenated hydrocarbon-based solvent such as methylene chloride, ethylene chloride, carbon tetrachloride, chloroform, or chlorobenzene, and the like. These solvents may be used singly, or may be used in a mixture thereof appropriately.

Examples of a kneading device used for preparing the above-described coating material include a continuous twin-screw kneading machine, a continuous twin-screw kneading machine capable of performing dilution in multiple stages, a kneader, a pressure kneader, a roll kneader, and the like, but are not particularly limited to these devices. Furthermore, examples of a dispersing device used for preparing the above-described coating material include a roll mill, a ball mill, a horizontal sand mill, a vertical sand mill, a spike mill, a pin mill, a tower mill, a pearl mill (for example, "DCP mill" manufactured by Eirich Co., Ltd. and the like), a homogenizer, an ultrasonic wave dispersing machine, and the like, but are not particularly limited to these devices.

Next, the base layer forming coating material is applied to one main surface 11A of the substrate 11 and dried to form the base layer 12. Subsequently, by applying the magnetic layer forming coating material onto the base layer 12 and drying the magnetic layer forming coating material, the magnetic layer 13 is formed on the base layer 12. Note that during drying, magnetic powder is preferably subjected to magnetic field orientation in the thickness direction of the substrate 11 by, for example, a solenoid coil. Furthermore, during drying, the magnetic powder may be subjected to magnetic field orientation in a traveling direction (longitudinal direction) of the substrate 11 by, for example, a solenoid coil, and then may be subjected to magnetic field orientation in a thickness direction of the substrate 11. By performing such a magnetic field orientation treatment, the degree of vertical orientation (that is, squareness ratio S1) of the magnetic powder can be improved. After the magnetic layer 13 is formed, the back layer forming coating material is applied to the other main surface 11B of the substrate 11 and dried to form the back layer 14. As a result, the magnetic recording medium 10 is obtained.

The squareness ratios S1 and S2 are set to desired values, for example, by adjusting the intensity of a magnetic field applied to a coating film of the magnetic layer forming coating material, the concentration of a solid content in the magnetic layer forming coating material, and drying conditions (drying temperature and drying time) of the coating film of the magnetic layer forming coating material. The intensity of a magnetic field applied to a coating film is preferably at least twice the coercive force of the magnetic powder. In order to further increase the squareness ratio S1 (that is, to further reduce the squareness ratio S2), it is preferable to improve the dispersion state of the magnetic powder in the magnetic layer forming coating material. Furthermore, in order to further increase the squareness ratio S1, it is also effective to magnetize the magnetic powder before the magnetic layer forming coating material is put into an orientation device for magnetic field orientation of the magnetic powder. Note that the above methods for adjusting the squareness ratios S1 and S2 may be used singly or in combination of two or more thereof.

Thereafter, the obtained magnetic recording medium 10 is calendered to smooth the surface 13S of the magnetic layer 13. Next, the magnetic recording medium 10 that has been calendered is wound into a roll shape. Thereafter, the magnetic recording medium 10 is heated in this state, and the large number of protrusions 14A on the surface 14S of the back layer 14 are thereby transferred onto the surface 13S of the magnetic layer 13. As a result, the large number of recesses 13A are formed on the surface 13S of the magnetic layer 13.

The temperature of the heat treatment is preferably 50° C. or higher and 80° C. or lower. When the temperature of the heat treatment is 50° C. or higher, good transferability can be obtained. Meanwhile, when the temperature of the heat treatment is 80° C. or lower, the amount of pores may be excessively increased, and the lubricant on the surface 13S of the magnetic layer 13 may be excessive. Here, the temperature of the heat treatment is the temperature of an atmosphere holding the magnetic recording medium 10.

Time for the heat treatment is preferably 15 hours or more and 40 hours or less. When the time for heat treatment is 15 hours or more, good transferability can be obtained. Meanwhile, when the time for heat treatment is 40 hours or less, a decrease in productivity can be suppressed.

Furthermore, a range of pressure applied to the magnetic recording medium 10 during the heat treatment is preferably 150 kg/cm or more and 400 kg/cm or less.

Finally, the magnetic recording medium 10 is cut into a predetermined width (for example, a width of ½ inches). As a result, the target magnetic recording medium 10 is obtained.

[1-3. Configuration of Recording/Reproducing Device 30]

Next, the configuration of the recording/reproducing device 30 for recording information on the magnetic recording medium 10 described above and reproducing information from the magnetic recording medium 10 described above will be described with reference to FIG. 9.

The recording/reproducing device 30 can adjust a tension applied to the magnetic recording medium 10 in a longitudinal direction thereof. Furthermore, the recording/reproducing device 30 can load the magnetic recording medium cartridge 10A thereon. Here, for ease of explanation, a case where the recording/reproducing device 30 can load one magnetic recording medium cartridge 10A thereon will be described. However, in the present disclosure, the recording/reproducing device 30 can load a plurality of magnetic recording medium cartridges 10A thereon. As described above, the magnetic recording medium 10 has a tape shape, and may be, for example, a long magnetic recording tape. The magnetic recording medium 10 may be housed in a casing in a state of being wound around a reel inside the magnetic recording medium cartridge 10A, for example. The magnetic recording medium 10 travels in the longitudinal direction during recording and reproduction. Furthermore, the magnetic recording medium 10 can record a signal at the shortest recording wavelength of preferably 100 nm or less, more preferably 75 nm or less, still more preferably 60 nm or less, particularly preferably 50 nm or less, and can be used, for example, for the recording/reproducing device 30 having the shortest recording wavelength within the above range. The recording track width can be, for example, 2 µm or less.

The recording/reproducing device 30 is connected to information processing devices such as a server 41 and a personal computer (hereinafter referred to as "PC") 42, for example, through a network 43, and data supplied from these information processing devices can be recorded in the magnetic recording medium cartridge 10A.

Figure 9:
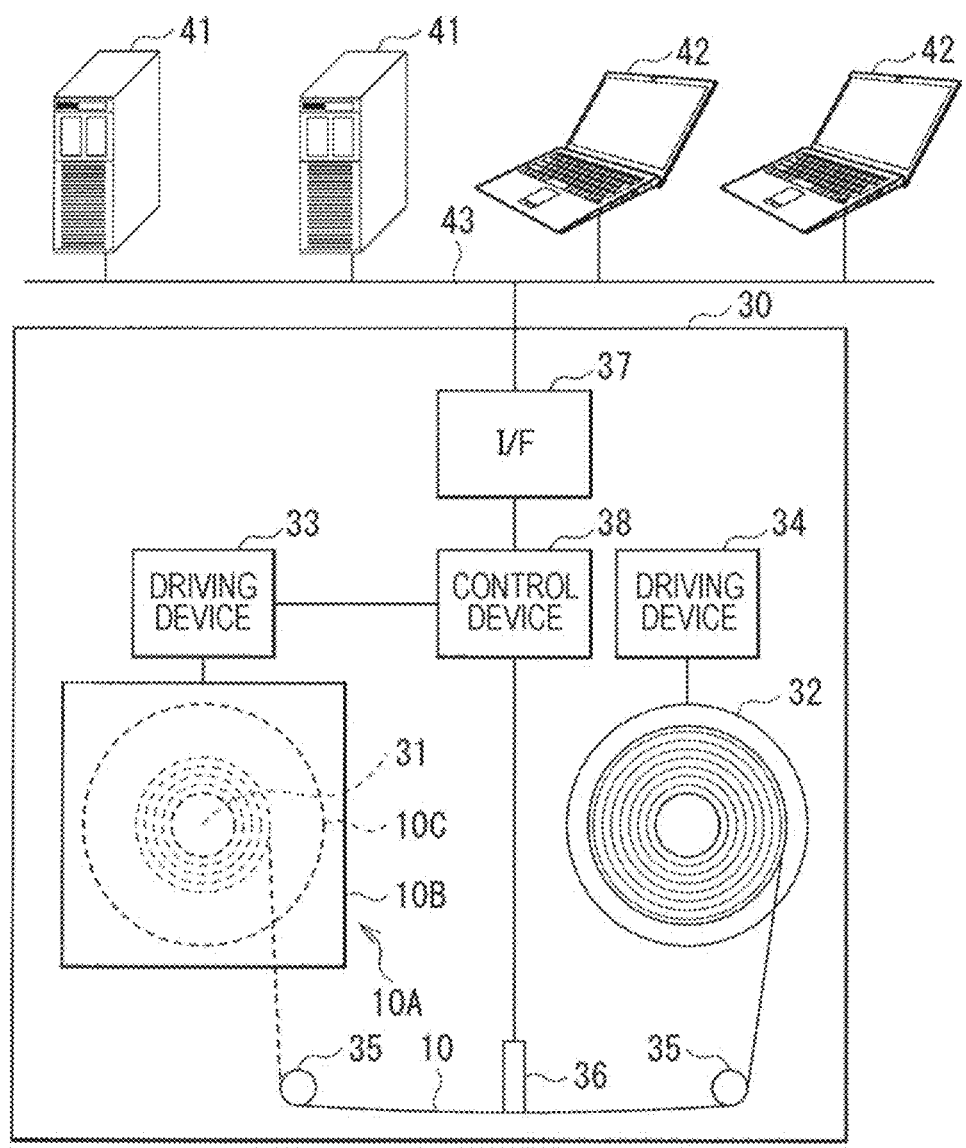
FIG. 9 is a schematic diagram of a recording/reproducing device using the magnetic recording medium illustrated in FIG. 1.

As illustrated in FIG. 9, the recording/reproducing device 30 includes a spindle 31, a reel 32, a driving device 33, a driving device 34, a plurality of guide rollers 35, a head unit 36, a communication interface (hereinafter referred to as I/F) 37, and a control device 38.

The spindle 31 can mount the magnetic recording medium cartridge 10A thereon. The magnetic recording medium cartridge 10A complies with the linear tape open (LTO) standard, and rotatably houses a single reel 10C in which the magnetic recording medium 10 is wound in a cartridge case 10B. A V-shaped servo pattern is recorded in advance as a servo signal on the magnetic recording medium 10. The reel 32 can fix a tip of the magnetic recording medium 10 pulled out from the magnetic recording medium cartridge 10A.

The driving device 33 rotationally drives the spindle 31. The driving device 34 rotationally drives the reel 32. When data is recorded or reproduced on the magnetic recording medium 10, the driving device 33 and the driving device 34 rotationally drive the spindle 31 and the reel 32, respectively, to cause the magnetic recording medium 10 to travel. The guide roller 35 is a roller for guiding traveling of the magnetic recording medium 10.

The head unit 36 includes a plurality of recording heads for recording data signals on the magnetic recording medium 10, a plurality of reproducing heads for reproducing data signals recorded on the magnetic recording medium 10, and a plurality of servo heads for reproducing servo signals recorded on the magnetic recording medium 10. As the recording head, for example, a ring type head can be used, and as the reproducing head, for example, a magnetoresistive effect type magnetic head can be used. However, the types of the recording head and reproducing head are not limited thereto.

The I/F 37 is for communicating with an information processing device such as the server 41 or the PC 42, and is connected to the network 43.

The control device 38 controls the entire recording/reproducing device 30. For example, the control device 38 causes the head unit 36 to record a data signal supplied from an information processing device such as the server 41 or the PC 42 on the magnetic recording medium 10 in response to a request from the information processing device. Furthermore, the control device 38 causes the head unit 36 to reproduce the data signal recorded on the magnetic recording medium 10 in response to a request from an information processing device such as the server 41 or the PC 42 and supplies the data signal to the information processing device.

[1-4 Effect]

As described above, the magnetic recording medium 10 of the present embodiment is a tape-shaped member in which the substrate 11, the base layer 12, the magnetic layer 13, and the back layer 14 are sequentially laminated, and satisfies the following constituent requirements (1) to (9).

(1) On the surface 13S of the magnetic layer 13, the recesses 13A having a depth of 20% or more of the average thickness of the magnetic layer 13 are formed at a ratio of 20 or more and 200 or less per 1600 µm$^2$.

(2) On the surface 13S of the magnetic layer 13, the recesses 13A having a depth of 20% or more of the average thickness of the magnetic layer 13 are formed at a ratio of 20 or more and 200 or less per 1600 µm$^2$.

(3) On the surface 13S of the magnetic layer 13, a logarithmic decay rate determined by a pendulum viscoelasticity test at a temperature of 10° C. or higher and 45° C. or lower is 0.025 or more and 0.035 or less.

(4) A difference between a maximum value of the logarithmic decay rate determined by the pendulum viscoelasticity test at a temperature of 10° C. or higher and 45° C. or lower and a minimum value of the logarithmic decay rate determined by the pendulum viscoelasticity test at a temperature of 10° C. or higher and 45° C. or lower is 0 or more and 0.020 or less.

(5) The squareness ratio in the perpendicular direction is 65% or more.

(6) The average thickness of the magnetic layer 13 is 90 nm or less.

(7) The average thickness of the magnetic recording medium 10 is 5.6 µm or less.

Because of having such a configuration, the magnetic recording medium 10 of the present embodiment can maintain good electromagnetic conversion characteristics even after the total thickness is reduced and repeated recording or repeated reproduction is executed. It is considered that this is because by forming the plurality of recesses 13A with an appropriate surface density, air trapped while the magnetic recording medium 10 is traveling can be released from the interface between the surface 13S of the magnetic layer 13 and the head, and by controlling the logarithmic decay rate determined by the pendulum viscoelasticity test, contact between the surface 13S of the magnetic layer 13 and the head and can be kept well.

2. Modification (Modification 1)

Figure 10:
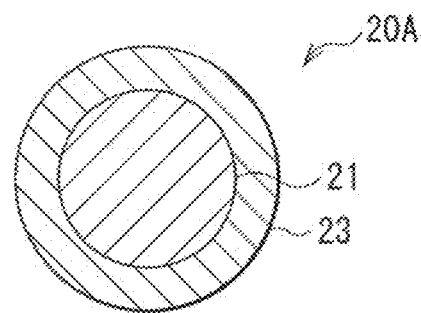
FIG. 10 is a cross-sectional view schematically illustrating a cross-sectional structure of an ε iron oxide particle as a modification.

In the embodiment described above, the ε iron oxide particle 20 (FIG. 4) having the two-layered shell portion 22 has been illustrated and described, but the magnetic recording medium of the present technology may include, for example, as illustrated in FIG. 10, an ε iron oxide particle 20A having a single-layered shell portion 23. The shell portion 23 in the E iron oxide particle 20A has a similar configuration to the first shell portion 22a, for example. However, the ε iron oxide particle 20 having the two-layered shell portion 22 described in the embodiment described above is more preferable than the ε iron oxide particle 20A of Modification 1 from a viewpoint of suppressing characteristic deterioration.

(Modification 2)

In the magnetic recording medium 10 according to the embodiment described above, the case where the ε iron oxide particle 20 having a core-shell structure has been illustrated and described. However, the ε iron oxide particle may include an additive instead of the core-shell structure, or may have a core-shell structure and include an additive. In this case, some of Fe atoms in the ε iron oxide particles are replaced with an additive. Even by inclusion of an additive in an ε iron oxide particle, a coercive force Hc of the entire ε iron oxide particles can be adjusted to a coercive force Hc suitable for recording. Therefore, recordability can be improved. The additive is a metal element other than iron, preferably a trivalent metal element, more preferably at least one of aluminum (Al), gallium (Ga), and indium (In), and still more preferably at least one of Al and Ga.

Specifically, the ε iron oxide including an additive is an ε—$Fe_2$-xMxO$_3$ crystal (in which M represents a metal element other than iron, preferably a trivalent metal element, more preferably at least one of Al, Ga, and In, and still more preferably at least one of Al and Ga, and x satisfies, for example, 0<x<1).

(Modification 3)

The magnetic powder of the present disclosure may include powder of nanoparticles including hexagonal ferrite (hereinafter referred to as "hexagonal ferrite particles") instead of the powder of ε iron oxide particles. The hexagonal ferrite particle has, for example, a hexagonal plate shape or a substantially hexagonal plate shape. The hexagonal ferrite preferably includes at least one of barium (Ba), strontium (Sr), lead (Pb), and calcium (Ca), more preferably at least one of Ba and Sr. Specifically, the hexagonal ferrite may be, for example, barium ferrite or strontium ferrite. The barium ferrite may further include at least one of Sr, Pb, and Ca in addition to Ba. The strontium ferrite may further include at least one of Ba, Pb, and Ca in addition to Sr.

More specifically, the hexagonal ferrite has an average composition represented by a general formula $MFe_{12}O_{19}$. However, M represents at least one metal of Ba, Sr, Pb, and Ca, preferably at least one metal of Ba and Sr, for example. M may represent a combination of Ba and one or more metals selected from the group consisting of Sr, Pb, and Ca. Furthermore, M may represent a combination of Sr and one or more metals selected from the group consisting of Ba, Pb, and Ca. In the above general formula, some of Fe atoms may be replaced with other metal elements.

In a case where the magnetic powder includes powder of hexagonal ferrite particles, the average particle size of the magnetic powder is preferably 50 nm or less, more preferably 40 nm or less, and still more preferably 30 nm or less. The average particle size of the magnetic powder is more preferably 25 nm or less, 22 nm or less, 21 nm or less, or 20 nm or less. Furthermore, the average particle size of the magnetic powder is, for example, 10 nm or more, preferably 12 nm or more, and more preferably 15 nm or more. Therefore, the average particle size of the magnetic powder including powder of hexagonal ferrite particles can be, for example, 10 nm or more and 50 nm or less, 10 nm or more and 40 nm or less, 12 nm or more and 30 nm or less, 12 nm or more and 25 nm or less, or 15 nm or more and 22 nm or less. In a case where the average particle size of the magnetic powder is the above upper limit value or less (for example, 50 nm or less, particularly 30 nm or less), in the magnetic recording medium 10 having a high recording density, good electromagnetic conversion characteristics (for example, SNR) can be obtained. In a case where the average particle size of the magnetic powder is the above lower limit value or more (for example, 10 nm or more, preferably 12 nm or more), the dispersibility of the magnetic powder is further improved, and better electromagnetic conversion characteristics (for example, SNR) can be obtained.

In a case where the magnetic powder includes hexagonal ferrite particles, the average aspect ratio of the magnetic powder can be preferably 1 or more and 3.5 or less, more preferably 1 or more and 3.1 or less, or 2 or more and 3.1 or less, and still more preferably 2 or more and 3 or less. When the average aspect ratio of the magnetic powder is within the above numerical range, aggregation of the magnetic powder can be suppressed, and moreover, resistance applied to the magnetic powder can be suppressed when the magnetic powder is vertically oriented in a step of forming the magnetic layer 13. This can improve the vertical orientation of the magnetic powder.

Note that the average particle size and average aspect ratio of the magnetic powder including powder of hexagonal ferrite particles are determined as follows. First, the magnetic recording medium 10 to be measured is processed to be thinned by a focused ion beam (FIB) method and the like. Thinning is performed in the length direction (longitudinal direction) of the magnetic tape. Cross-sectional observation is performed for the obtained thin sample such that the entire recording layer is included with respect to the thickness direction of the recording layer using a transmission electron microscope (H-9500 manufactured by Hitachi High-Technologies) with an acceleration voltage of 200 kV and an overall magnification of 500,000 times. Next, from the imaged TEM photograph, 50 particles each having a side surface directed to an observation surface are selected, and maximum plate thicknesses DA of the particles are measured. The maximum plate thicknesses DA thus determined are simply averaged (arithmetically averaged) to determine an average maximum plate thickness DAave. Subsequently, plate diameters DB of the particles of the magnetic powder are measured. Here, the plate diameter DB means the largest distance among distances between two parallel lines drawn from all angles so as to come into contact with an outline of each of the particles of the magnetic powder (so-called maximum Feret diameter). Subsequently, the measured plate diameters DB are simply averaged (arithmetically averaged) to determine an average plate diameter DBave. Then, an average aspect ratio (DBave/DAave) of the particles is determined from the average maximum plate thickness DAave and the average plate diameter DBave.

In a case where the magnetic powder includes powder of hexagonal ferrite particles, the average particle volume of the magnetic powder is preferably 5900 nm$^3$ or less, more preferably 500 nm$^3$ or more and 3400 nm$^3$ or less, and still more preferably 1000 nm$^3$ or more and 2500 nm$^3$ or less. When the average particle volume of the magnetic powder is 5900 nm$^3$ or less, a similar effect to that in a case where the average particle size of the magnetic powder is 30 nm or less can be obtained. Meanwhile, when the average particle volume of the magnetic powder is 500 nm$^3$ or more, a similar effect to a case where the average particle size of the magnetic powder is 12 nm or more can be obtained.

Note that the average particle volume of the magnetic powder is determined as follows. First, the average maximum plate thickness DAave and the average maximum plate diameter DBave are determined by the above-described method for calculating the average particle size of the magnetic powder. Next, an average volume V of the ε iron oxide particles is determined by the following formula.

$$V = \frac{3\sqrt{3}}{8} \times DA_{ave} \times DB_{ave} \times DB_{ave} \quad \text{[Numerical Formula 4]}$$

According to a particularly preferable embodiment of the present technology, the magnetic powder can be barium ferrite magnetic powder or strontium ferrite magnetic powder, and more preferably barium ferrite magnetic powder. Barium ferrite magnetic powder includes iron oxide magnetic particles having barium ferrite as a main phase (hereinafter referred to as "barium ferrite particles"). Barium ferrite magnetic powder has high data recording reliability. For example, barium ferrite magnetic powder keeps coercive force even in a high-temperature and high-humidity environment. Barium ferrite magnetic powder is preferable as magnetic powder from such a viewpoint.

The average particle size of barium ferrite magnetic powder is 50 nm or less, more preferably 10 nm or more and 40 nm or less, and still more preferably 12 nm or more and 25 nm or less.

In a case where the magnetic layer 13 includes barium ferrite magnetic powder as magnetic powder, the average thickness tm [nm] of the magnetic layer 13 preferably satisfies 35 nm≤tm≤100 nm, and is particularly preferably 80 nm or less. Furthermore, the magnetic recording medium 10 has a coercive force Hc of preferably 160 kA/m or more and 280 kA/m or less, more preferably 165 kA/m or more and 275 kA/m or less, still more preferably 170 kA/m or more and 270 kA/m or less when the coercive force Hc is measured in a thickness direction (perpendicular direction) of the magnetic recording medium 10.

(Modification 4)

The magnetic powder may include powder of nanoparticles including Co-containing spinel ferrite (hereinafter referred to as "cobalt ferrite particles") instead of the powder of ε iron oxide particles. The cobalt ferrite particle preferably has uniaxial crystal anisotropy. The cobalt ferrite particle has, for example, a cubic shape or a substantially cubic shape. The Co-containing spinel ferrite may further include at least one of Ni, Mn, Al, Cu, and Zn in addition to Co.

The Co-containing spinel ferrite has, for example, an average composition represented by the following formula.

(Provided that in formula (1), M represents, for example, at least one metal of Ni, Mn, Al, Cu, and Zn). x represents a value within a range of 0.4≤x≤1.0. y represents a value within a range of 0≤y≤0.3. Provided that x and y satisfy a relationship of (x+y)≤1.0. z represents a value within a range of 3≤z≤4. Some of Fe atoms may be replaced with another metal element.)

In a case where the magnetic powder includes powder of cobalt ferrite particles, the average particle size of the magnetic powder is preferably 25 nm or less, and more preferably 10 nm or more and 23 nm or less. When the average particle size of the magnetic powder is 25 nm or less, good electromagnetic conversion characteristics (for example, SNR) can be obtained in the magnetic recording medium 10 having a high recording density. Meanwhile, when the average particle size of the magnetic powder is 10 nm or more, dispersibility of the magnetic powder is further improved, and better electromagnetic conversion characteristics (for example, SNR) can be obtained. In a case where the magnetic powder includes powder of cobalt ferrite particles, the average aspect ratio of the magnetic powder is similar to that of the embodiment described above. Furthermore, a method for calculating the average particle size and the average aspect ratio of the magnetic powder is determined in a similar manner to that of the embodiment described above.

The average particle volume of the magnetic powder is preferably 15000 nm$^3$ or less, and more preferably 1000 nm$^3$ or more and 12000 nm$^3$ or less. When the average particle volume of the magnetic powder is 15000 nm$^3$ or less, a similar effect to that in a case where the average particle size of the magnetic powder is 25 nm or less can be obtained. Meanwhile, when the average particle volume of the magnetic powder is 1000 nm$^3$ or more, a similar effect to a case where the average particle size of the magnetic powder is 10 nm or more can be obtained. Note that a method for calculating the average particle volume of the magnetic powder is similar to the method for calculating the average particle volume of the magnetic powder (the method for calculating the average particle volume in a case where the ε iron oxide particle has a cubic shape or a substantially cubic shape) in the embodiment described above.

The coercive force Hc of cobalt ferrite magnetic powder is preferably 2500 Oe or more, and more preferably 2600 Oe or more and 3500 Oe or less.

(Modification 5)

Figure 11:
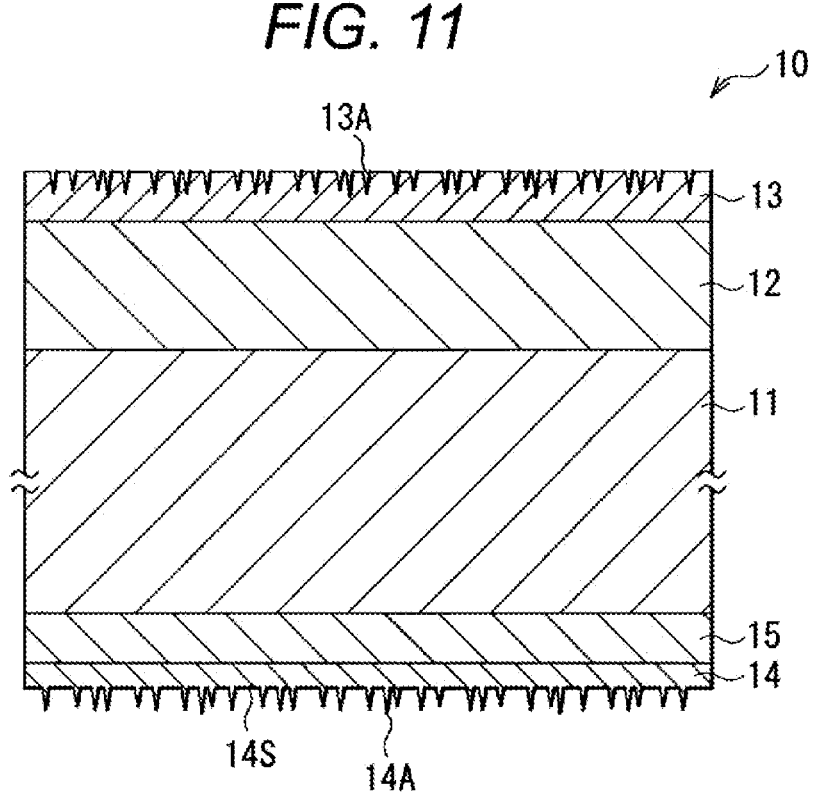
FIG. 11 is a cross-sectional view of a magnetic recording medium as another modification.

The magnetic recording medium 10 may further include a barrier layer 15 disposed on at least one surface of the substrate 11, for example, as illustrated in FIG. 11. The barrier layer 15 is a layer for suppressing a dimensional change according to an environment of the substrate 11. Examples of a cause of the dimensional change include a hygroscopic property of the substrate 11. However, by disposing the barrier layer 15, a penetration rate of moisture into the substrate 11 can be reduced. The barrier layer 15 includes, for example, a metal or a metal oxide. As the metal herein, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, and Ta can be used. As the metal oxide, for example, a metal oxide including one or more of the above metals can be used. More specifically, for example, at least one of $Al_2O_3$, CuO, CoO, $SiO_2$, $Cr_2O_3$, $TiO_2$, $Ta_2O_5$, and $ZrO_2$ can be used. Furthermore, the barrier layer 15 may include diamond-like carbon (DLC), diamond, and the like.

The average thickness of the barrier layer 15 is preferably 20 nm or more and 1000 nm or less, and more preferably 50 nm or more and 1000 nm or less. The average thickness of the barrier layer 15 is determined in a similar manner to the average thickness of the magnetic layer 13. However, a magnification of a TEM image is appropriately adjusted according to the thickness of the barrier layer 15.

(Modification 6)

In the embodiment described above, the case where the large number of recesses 13A are formed on the surface 13S of the magnetic layer 13 by transferring the large number of protrusions 14A formed on the surface 14S of the back layer 14 onto the surface 13S of the magnetic layer 13 has been described. However, the method for forming the large number of recesses 13A is not limited thereto. For example, the large number of recesses 13A may be formed on the surface 13S of the magnetic layer 13 by adjusting the type of a solvent included in the magnetic layer forming coating material, drying conditions of the magnetic layer forming coating material, and the like.

(Modification 7)

The magnetic recording medium 10 according to the embodiment described above may be used for a library device. In this case, the library device may include a plurality of the recording/reproducing devices 30 in the embodiment described above.

EXAMPLES

Hereinafter, the present disclosure will be described specifically with Examples, but the present disclosure is not limited only to Examples below.

In the following Examples and Comparative Examples, the surface density of recesses having a depth of 20% or more of the average thickness of the magnetic layer, the logarithmic decay rate determined by the pendulum viscoelasticity test in the temperature range of 10° C. or higher and 45° C. or lower, the squareness ratio in the perpendicular direction (perpendicular orientation degree), the average thickness of the magnetic layer, and the average thickness of the magnetic recording medium are values determined by the measurement method described in the above-described embodiment.

Example 1

A magnetic recording medium as Example 1 was obtained as follows.

<Step of Preparing Magnetic Layer Forming Coating Material>

A magnetic layer forming coating material was prepared as follows. First, a first composition having the following formulation was kneaded with an extruder. Next, the kneaded first composition and a second composition having the following formulation were added to a stirring tank equipped with a disper, and were premixed. Subsequently, the mixture was further subjected to sand mill mixing, and was subjected to a filter treatment to prepare a magnetic layer forming coating material.

(First Composition)

Each component and weight in the first composition are as follows.

Powder of barium ferrite ($BaFe_{12}O_{19}$) particles (hexagonal plate shape, average aspect ratio 2.8, average particle volume 1950 $nm^3$): 100 parts by mass Vinyl chloride-based resin cyclohexanone solution: 65 parts by mass (The composition of the solution includes 30% by mass of resin and 70% by mass of cyclohexanone. Details of the vinyl chloride-based resin were as follows: degree of polymerization: 300, Mn=10000, $OSO_3K$=0.07 mmol/g and secondary OH=0.3 mmol/g were included as polar groups)

Aluminum oxide powder ($\alpha$-$Al_2O_3$, average particle diameter 0.2 μm): 5 parts by mass (Second Composition)

Each component and weight in the second composition are as follows.

Vinyl chloride-based resin: 1.1 parts by mass (The composition of the solution includes 30% by mass of resin and 70% by mass of cyclohexanone.)

Carbon black: 2 parts by mass (Manufactured by Tokai Carbon Co., Ltd., trade name: Seast TA)

n-Butyl stearate as a fatty acid ester: 2 parts by mass

Methyl ethyl ketone: 121.3 parts by mass

Toluene: 121.3 parts by mass

Cyclohexanone: 60.7 parts by mass

To the magnetic layer forming coating material prepared as described above, 4 parts by mass of polyisocyanate (trade name: Coronate L, manufactured by Tosoh Corporation) as a curing agent and 2 parts by mass of stearic acid as a fatty acid were added.

<Step of Preparing Base Layer Forming Coating Material>

A base layer forming coating material was prepared as follows. First, a third composition having the following formulation was kneaded with an extruder. Next, the kneaded third composition and a fourth composition having the following formulation were added to a stirring tank equipped with a disper, and were premixed. Subsequently, the mixture was further subjected to sand mill mixing, and was subjected to a filter treatment to prepare a base layer forming coating material.

(Third Composition)

Each component and weight in the third composition are as follows.

Acicular iron oxide powder ($\alpha$-$Fe_2O_3$, average major axis length 0.15 μm): 100 parts by mass Vinyl chloride-based resin (resin solution: resin content 30% by mass, cyclohexanone 70% by mass): 55.6 parts by mass Carbon black (average particle diameter 20 nm): 10 parts by mass (Fourth Composition)

Each component and weight in the fourth composition are as follows.

Polyurethane-based resin UR8200 (manufactured by Toyobo Co., Ltd.): 18.5 parts by mass n-Butyl stearate as a fatty acid ester: 2 parts by mass Methyl ethyl ketone: 108.2 parts by mass Toluene: 108.2 parts by mass Cyclohexanone: 18.5 parts by mass To the base layer forming coating material prepared as described above, 4 parts by mass of polyisocyanate (trade name: Coronate L, manufactured by Tosoh Corporation) as a curing agent and 2 parts by mass of stearic acid as a fatty acid were added.

<Step of Preparing Back Layer Forming Coating Material>

A back layer forming coating material was prepared as follows. The following raw materials were mixed in a stirring tank equipped with a disper, and were subjected to filter treatment to prepare a back layer forming coating material.

Carbon black powder having a small particle diameter (average particle diameter (D50) 20 nm): 100 parts by mass Carbon black powder having a large particle diameter (average particle diameter (D50) 300 nm): 0 parts by mass Polyester polyurethane (manufactured by Tosoh Corporation, trade name: N-2304): 100 parts by mass Methyl ethyl ketone: 500 parts by mass Toluene: 400 parts by mass Cyclohexanone: 100 parts by mass <Application Step>

Using the magnetic layer forming coating material and the base layer forming coating material prepared as described above, a base layer and a magnetic layer were formed on one main surface of a long polyester film having an average thickness of 4.0 μm as a nonmagnetic support such that the average thickness of the base layer was 0.6 μm and the average thickness of the magnetic layer was 80 nm after calendering as follows. First, the base layer forming coating material was applied onto one main surface of the polyester film and dried to form a base layer. Next, the magnetic layer forming coating material was applied onto the base layer and dried to form a magnetic layer. Note that the weight ratio between the vinyl chloride-based resin and the polyurethane-based resin in the binder of the magnetic layer was set to 1:1 as illustrated in Table 1 below. Furthermore, the magnetic powder was subjected to magnetic field orientation in a thickness direction of the film by a solenoid coil when the magnetic layer forming coating material was dried. The squareness ratio of the magnetic recording medium in the thickness direction (perpendicular direction) was set to 67%. Subsequently, the back layer forming coating material was applied onto the other main surface of the polyester film and dried to form a back layer having an average thickness of 0.3 μm. As a result, a magnetic recording medium was obtained.

<Calendering Step and Transfer Step>

Subsequently, calendering was performed to smooth a surface of the magnetic layer.

Next, the magnetic recording medium having a smooth surface of the magnetic layer was wound into a roll shape, and then the magnetic recording medium was heated at 60° C. for 10 hours in this state. Then, the magnetic recording medium was rewound in a roll shape such that an end located on an inner circumferential side was located on an outer circumferential side oppositely, and then the magnetic recording medium was heated again at 60° C. for 10 hours in this state. As a result, a large number of protrusions on the surface of the back layer were transferred onto the surface of the magnetic layer to form a large number of recesses on the surface of the magnetic layer. The number of recesses having a depth of 20% or more of the average thickness of the magnetic layer was set to 20 per 1600 μm².

<Cutting Step>

The magnetic recording medium obtained as described above was cut into a width of ½ inches (12.65 mm). As a result, the target long magnetic recording medium (average thickness 5.6 μm) was obtained.

Example 2

By adjusting the calendering temperature (to a temperature lower than that in Example 1), the number of recesses having a depth of 20% or more of the average thickness of the magnetic layer was set to 40 per 1600 μm². A magnetic recording medium as Example 2 was obtained in a similar manner to Example 1 described above except for this.

Example 3

In the back layer forming coating material, the content of carbon black powder having a small particle diameter (average particle diameter (D50) 20 nm) was set to 95 parts by mass, the content of carbon black powder having a large particle diameter (average particle diameter (D50) 300 nm) was set to 5 parts by mass, and the number of recesses having a depth of 20% or more of the average thickness of the magnetic layer was set to 80 per 1600 μm². A magnetic recording medium as Example 3 was obtained in a similar manner to Example 1 described above except for this.

Example 4

In the back layer forming coating material, the content of carbon black powder having a small particle diameter (average particle diameter (D50) 20 nm) was set to 95 parts by mass, and the content of carbon black powder having a large particle diameter (average particle diameter (D50) 300 nm) was set to 5 parts by mass. Moreover, the calendering temperature was adjusted (to a temperature lower than that in Example 1). As a result, the number of recesses having a depth of 20% or more of the average thickness of the magnetic layer was set to 100 per 1600 m². A magnetic recording medium as Example 4 was obtained in a similar manner to Example 1 described above except for this.

Example 5

In the back layer forming coating material, the content of carbon black powder having a small particle diameter (average particle diameter (D50) 20 nm) was set to 90 parts by mass, and the content of carbon black powder having a large particle diameter (average particle diameter (D50) 300 nm) was set to 10 parts by mass. As a result, the number of recesses having a depth of 20% or more of the average thickness of the magnetic layer was set to 150 per 1600 μm². A magnetic recording medium as Example 5 was obtained in a similar manner to Example 1 described above except for this.

Example 6

In the back layer forming coating material, the content of carbon black powder having a small particle diameter (average particle diameter (D50) 20 nm) was set to 90 parts by mass, and the content of carbon black powder having a large particle diameter (average particle diameter (D50) 300 nm) was set to 10 parts by mass. Moreover, the calendering temperature was adjusted (to a temperature lower than that in Example 1). As a result, the number of recesses having a depth of 20% or more of the average thickness of the magnetic layer was set to 180 per 1600 m². A magnetic recording medium as Example 6 was obtained in a similar manner to Example 1 described above except for this.

Example 7

The calendering temperature was adjusted (to a temperature further lower than that in Example 6). As a result, the number of recesses having a depth of 20% or more of the average thickness of the magnetic layer was set to 200 per 1600 μm². A magnetic recording medium as Example 7 was obtained in a similar manner to Example 6 described above except for this.

Example 8

In the back layer forming coating material, the content of carbon black powder having a small particle diameter (average particle diameter (D50) 20 nm) was set to 95 parts by mass, and the content of carbon black powder having a large particle diameter (average particle diameter (D50) 300 nm) was set to 5 parts by mass. The calendering temperature was adjusted (to a temperature lower than that in Example 1). Moreover, the weight ratio between the vinyl chloride-based resin and the polyurethane-based resin in the binder of the magnetic layer was set to 3:1 as illustrated in Table 1. As a result, the number of recesses having a depth of 20% or more of the average thickness of the magnetic layer was set to 100 per 1600 μm². A magnetic recording medium as Example 8 was obtained in a similar manner to Example 1 described above except for this.

Example 9

The weight ratio between the vinyl chloride-based resin and the polyurethane-based resin in the binder of the magnetic layer was set to 1:1.5 as illustrated in Table 1. As a result, the number of recesses having a depth of 20% or more of the average thickness of the magnetic layer was set to 100 per 1600 µm². A magnetic recording medium as Example 9 was obtained in a similar manner to Example 8 described above except for this.

Example 10

In the back layer forming coating material, the content of carbon black powder having a small particle diameter (average particle diameter (D50) 20 nm) was set to 95 parts by mass, and the content of carbon black powder having a large particle diameter (average particle diameter (D50) 300 nm) was set to 5 parts by mass. The calendering temperature was adjusted (to a temperature lower than that in Example 1). Moreover, as the polyurethane-based resin in the binder of the magnetic layer, a polyurethane-based resin having a glass transition point of 100° C. as illustrated in Table 1 was used. As a result, the number of recesses having a depth of 20% or more of the average thickness of the magnetic layer was set to 100 per 1600 µm². A magnetic recording medium as Example 10 was obtained in a similar manner to Example 1 described above except for this.

Example 11

In the back layer forming coating material, the content of carbon black powder having a small particle diameter (average particle diameter (D50) 20 nm) was set to 95 parts by mass, and the content of carbon black powder having a large particle diameter (average particle diameter (D50) 300 nm) was set to 5 parts by mass. The calendering temperature was adjusted (to a temperature lower than that in Example 1). Moreover, as the polyurethane-based resin in the binder of the magnetic layer, a polyurethane-based resin having a glass transition point of 60° C. as illustrated in Table 1 was used. As a result, the number of recesses having a depth of 20% or more of the average thickness of the magnetic layer was set to 100 per 1600 µm². A magnetic recording medium as Example 10 was obtained in a similar manner to Example 1 described above except for this.

Example 12

In the step of preparing the magnetic layer forming coating material, powder of strontium ferrite particles (hexagonal plate shape, average aspect ratio 3.0, average particle size 21.3 nm, particle volume 2000 nm³) was used as the magnetic powder. A magnetic recording medium as Example 12 was obtained in a similar manner to Example 4 described above except for this.

Example 13

In the step of preparing the magnetic layer forming coating material, powder of ε iron oxide particles (spherical shape, average aspect ratio 1.1, average particle size 16 nm, particle volume 2150 nm³) was used as the magnetic powder. A magnetic recording medium as Example 13 was obtained in a similar manner to Example 4 described above except for this.

Example 14

In the step of preparing the magnetic layer forming coating material, cobalt ferrite powder (cubic shape, average aspect ratio 1.7, average particle size 18.5 nm, particle volume 2200 nm³) was used as the magnetic powder. A magnetic recording medium as Example 14 was obtained in a similar manner to Example 4 described above except for this.

Example 15

In the application step, a polyethylene terephthalate (PET) film was used instead of a polyester (PEN) film as a substrate to which the magnetic layer forming coating material and the base layer forming coating material were applied. A magnetic recording medium as Example 15 was obtained in a similar manner to Example 4 described above except for this.

Example 16

In the application step, a polyether ether ketone (PEEK) film was used instead of a polyester film as a substrate to which the magnetic layer forming coating material and the base layer forming coating material were applied. A magnetic recording medium as Example 16 was obtained in a similar manner to Example 4 described above except for this.

Example 17

In the application step, the drying conditions were adjusted, and the squareness ratio of the magnetic recording medium in the thickness direction (perpendicular direction) was set to 65%. A magnetic recording medium as Example 17 was obtained in a similar manner to Example 4 described above except for this.

Example 18

In the application step, the average thickness of the magnetic layer was set to 80 nm. A magnetic recording medium as Example 18 was obtained in a similar manner to Example 4 described above except for this.

Comparative Example 1

By adjusting the calendering temperature (to a temperature higher than that in Example 1), the number of recesses having a depth of 20% or more of the average thickness of the magnetic layer was set to 15 per 1600 µm². A magnetic recording medium as Comparative Example 1 was obtained in a similar manner to Example 1 described above except for this.

Comparative Example 2

In the back layer forming coating material, the content of carbon black powder having a small particle diameter (average particle diameter (D50) 20 nm) was set to 80 parts by mass, the content of carbon black powder having a large particle diameter (average particle diameter (D50) 300 nm) was set to 20 parts by mass, and the number of recesses having a depth of 20% or more of the average thickness of the magnetic layer was set to 230 per 1600 µm². A magnetic recording medium as Comparative Example 2 was obtained in a similar manner to Example 1 described above except for this.

Comparative Example 3

The weight ratio between the vinyl chloride-based resin and the polyurethane-based resin in the binder of the magnetic layer was set to 1:0 as illustrated in Table 1. As a result, the number of recesses having a depth of 20% or more of the average thickness of the magnetic layer was set to 100 per 1600 μm². A magnetic recording medium as Comparative Example 3 was obtained in a similar manner to Example 4 described above except for this.

Comparative Example 4

The weight ratio between the vinyl chloride-based resin and the polyurethane-based resin in the binder of the magnetic layer was set to 4:1 as illustrated in Table 1. As a result, the number of recesses having a depth of 20% or more of the average thickness of the magnetic layer was set to 100 per 1600 μm². A magnetic recording medium as Comparative Example 4 was obtained in a similar manner to Example 4 described above except for this.

Comparative Example 5

The weight ratio between the vinyl chloride-based resin and the polyurethane-based resin in the binder of the magnetic layer was set to 1:4 as illustrated in Table 1. As a result, the number of recesses having a depth of 20% or more of the average thickness of the magnetic layer was set to 100 per 1600 μm². A magnetic recording medium as Comparative Example 5 was obtained in a similar manner to Example 4 described above except for this.

Comparative Example 6

As the polyurethane-based resin in the binder of the magnetic layer, a polyurethane-based resin having a glass transition point of 30° C. as illustrated in Table 1 was used. As a result, the number of recesses having a depth of 20% or more of the average thickness of the magnetic layer was set to 100 per 1600 μm². A magnetic recording medium as Comparative Example 6 was obtained in a similar manner to Example 4 described above except for this.

Comparative Example 7

The weight ratio between the vinyl chloride-based resin and the polyurethane-based resin in the binder of the magnetic layer was set to 1:1.5 as illustrated in Table 1. Moreover, as the polyurethane-based resin in the binder of the magnetic layer, a polyurethane-based resin having a glass transition point of 30° C. as illustrated in Table 1 was used. As a result, the number of recesses having a depth of 20% or more of the average thickness of the magnetic layer was set to 100 per 1600 μm². A magnetic recording medium as Comparative Example 6 was obtained in a similar manner to Example 4 described above except for this.

[Evaluation]

The magnetic recording media in Examples 1 to 18 and Comparative Examples 1 to 7 obtained in such a manner as described above were evaluated as follows.

(Room Temperature SNR)

Using a ½ inch tape traveling device (manufactured by Mountain Engineering II, MTS Transport) equipped with a recording/reproducing head and a recording/reproducing amplifier, the electromagnetic conversion characteristics (SNR) of each of the magnetic recording media were measured in an environment of 25° C. A ring head having a gap length of 0.2 μm was used as the recording head, and a GMR head having a shield-to-shield distance of 0.1 μm was used as the reproducing head. A relative speed, a recording clock frequency, and a recording track width were set to 6 μm/s, 160 MHz, and 2.0 μm, respectively. Furthermore, the SNR was calculated on the basis of a method described in the following document. The results are illustrated in Table 1 as relative values with the SNR of Example 1 as 0 dB.

Y Okazaki: "An Error Rate Emulation System.", IEEE Trans. Man., 31, pp. 3093-3095 (1995)

(Decrease in SNR)

Full volume recording was performed on a magnetic recording medium at 45° C., that is, recording was performed on the entire recording area over the full length of the magnetic recording medium. Thereafter, SNR was measured when all information recorded on the magnetic recording medium was reproduced. Next, full volume recording was performed on the magnetic recording medium at 10° C. Thereafter, SNR was measured when all information recorded on the magnetic recording medium was reproduced. A difference between the SNR at 45° C. and the SNR at 10° C. obtained as described above was defined as a decrease in SNR.

Table 1 summarizes the configuration and evaluation results of the magnetic recording media in Examples and Comparative Examples.

TABLE 1

| | Number of 20% depth recesses/ 1600 nm² | Pendulum viscoelasticity decay rate | | Magnetic powder | Perpendicular orientation % | Thickness of magnetic layer nm | Total thickness μm | Substrate | Room temperature SNR | Decrease in SNR when full volume traveling was performed at 10° C. after full volume traveling at 45° C. dB | Composition of carbon in back layer 20 nm:300 nm | Composition of binder PVC:PU | PU species (Tg) ° C. |
|---|---|---|---|---|---|---|---|---|---|---|---|---|---|
| | | Minimum value at 10-45° C. | Maximum value − minimum value | | | | | | | | | | |
| Example 1 | 20 | 0.030 | 0.015 | BaFe₁₂O₁₉ | 67 | 70 | 5.4 | PEN | 0.0 | −0.5 | 100:0 | 1:1 | 75 |
| Example 2 | 40 | 0.030 | 0.015 | BaFe₁₂O₁₉ | 67 | 70 | 5.4 | PEN | 0.2 | −0.5 | 100:0 | 1:1 | 75 |
| Example 3 | 80 | 0.030 | 0.015 | BaFe₁₂O₁₉ | 67 | 70 | 5.4 | PEN | 0.4 | −0.5 | 95:5 | 1:1 | 75 |
| Example 4 | 100 | 0.030 | 0.015 | BaFe₁₂O₁₉ | 67 | 70 | 5.4 | PEN | 0.5 | −0.3 | 95:5 | 1:1 | 75 |
| Example 5 | 150 | 0.030 | 0.015 | BaFe₁₂O₁₉ | 67 | 70 | 5.4 | PEN | 0.8 | −0.3 | 90:10 | 1:1 | 75 |
| Example 6 | 180 | 0.030 | 0.015 | BaFe₁₂O₁₉ | 67 | 70 | 5.4 | PEN | 0.7 | −0.3 | 90:10 | 1:1 | 75 |
| Example 7 | 200 | 0.030 | 0.015 | BaFe₁₂O₁₉ | 67 | 70 | 5.4 | PEN | 0.3 | −0.3 | 90:10 | 1:1 | 75 |
| Example 8 | 100 | 0.025 | 0.013 | BaFe₁₂O₁₉ | 67 | 70 | 5.4 | PEN | 0.5 | 0.0 | 95:5 | 3:1 | 75 |

TABLE 1-continued

| | Number of 20% depth recesses/ 1600 nm² | Pendulum viscoelasticity decay rate | | Magnetic powder | Perpendicular orientation % | Thickness of magnetic layer nm | Total thickness μm | Substrate | Room temperature SNR | Decrease in SNR when full volume traveling was performed at 10° C. after full volume traveling at 45° C. dB | Composition of carbon in back layer 20 nm:300 nm | Composition of binder PVC:PU | PU species (Tg) ° C. |
|---|---|---|---|---|---|---|---|---|---|---|---|---|---|
| | | Minimum value at 10-45° C. | Maximum value − minimum value | | | | | | | | | | |
| Example 9 | 100 | 0.035 | 0.018 | BaFe₁₂O₁₉ | 67 | 70 | 5.4 | PEN | 0.5 | −0.5 | 95:5 | 1:1.5 | 75 |
| Example 10 | 100 | 0.031 | 0.010 | BaFe₁₂O₁₉ | 67 | 70 | 5.4 | PEN | 0.5 | −0.1 | 95:5 | 1:1 | 100 |
| Example 11 | 100 | 0.032 | 0.018 | BaFe₁₂O₁₉ | 67 | 70 | 5.4 | PEN | 0.5 | −0.5 | 95:5 | 1:1 | 60 |
| Example 12 | 100 | 0.030 | 0.015 | SrFe₁₂O₁₉ | 67 | 70 | 5.4 | PEN | 0.5 | −0.3 | 95:5 | 1:1 | 75 |
| Example 13 | 100 | 0.030 | 0.015 | ε iron oxide | 67 | 70 | 5.4 | PEN | 0.5 | −0.3 | 95:5 | 1:1 | 75 |
| Example 14 | 100 | 0.030 | 0.015 | Co-ferrite | 67 | 70 | 5.4 | PEN | 0.5 | −0.3 | 95:5 | 1:1 | 75 |
| Example 15 | 100 | 0.030 | 0.015 | BaFe₁₂O₁₉ | 67 | 70 | 5.4 | PET | 0.5 | −0.3 | 95:5 | 1:1 | 75 |
| Example 16 | 100 | 0.030 | 0.015 | BaFe₁₂O₁₉ | 67 | 70 | 5.4 | PEEK | 0.5 | −0.3 | 95:5 | 1:1 | 75 |
| Example 17 | 100 | 0.030 | 0.015 | BaFe₁₂O₁₉ | 65 | 70 | 5.4 | PEN | 0.3 | −0.3 | 95:5 | 1:1 | 75 |
| Example 18 | 100 | 0.030 | 0.015 | BaFe₁₂O₁₉ | 67 | 80 | 5.4 | PEN | 0.3 | −0.3 | 95:5 | 1:1 | 75 |
| Comparative Example 1 | 15 | 0.030 | 0.015 | BaFe₁₂O₁₉ | 67 | 70 | 5.4 | PEN | −1.0 | −0.5 | 100:0 | 1:1 | 75 |
| Comparative Example 2 | 230 | 0.030 | 0.015 | BaFe₁₂O₁₉ | 67 | 70 | 5.4 | PEN | −0.5 | −0.7 | 100:0 | 1:1 | 75 |
| Comparative Example 3 | 100 | 0.015 | 0.011 | BaFe₁₂O₁₉ | 67 | 70 | 5.4 | PEN | −0.5 | −1.0 | 100:0 | 1:0 | — |
| Comparative Example 4 | 100 | 0.018 | 0.012 | BaFe₁₂O₁₉ | 67 | 70 | 5.4 | PEN | −0.2 | −1.0 | 100:0 | 4:1 | 75 |
| Comparative Example 5 | 100 | 0.040 | 0.019 | BaFe₁₂O₁₉ | 67 | 70 | 5.4 | PEN | 0.2 | −1.5 | 100:0 | 1:4 | 75 |
| Comparative Example 6 | 100 | 0.034 | 0.021 | BaFe₁₂O₁₉ | 67 | 70 | 5.4 | PEN | 0.0 | −1.9 | 100:0 | 1:1 | 30 |
| Comparative Example 7 | 100 | 0.035 | 0.022 | BaFe₁₂O₁₉ | 67 | 70 | 5.4 | PEN | 0.0 | −2.1 | 100:0 | 1:1.5 | 30 |

As illustrated in Table 1, in Examples 1 to 18, on the surface 13S of the magnetic layer 13, the recesses 13A having a depth of 20% or more of the average thickness of the magnetic layer 13 are formed at a ratio of 20 or more and 200 or less per 1600 μm². The logarithmic decay rate Δ on the surface 13S of the magnetic layer 13 determined by the pendulum viscoelasticity test at a temperature of 10° C. or higher and 45° C. or lower was 0.025 or more and 0.035 or less. A difference between a maximum value of the logarithmic decay rate Δ and a minimum value of the logarithmic decay rate Δ is 0 or more and 0.020 or less. Therefore, good results were obtained in both room temperature SNR and SNR deterioration.

In Comparative Example 1, since the recessed portions 13A having a depth of 20% or more of the average thickness of the magnetic layer 13 were formed at a ratio of 15 per 1600 m², the room temperature SNR deteriorated. It is considered that this is because air trapped while the magnetic recording medium was traveling could not be released sufficiently from the interface between the surface of the magnetic layer and the head, an air layer was generated between the surface 13S of the magnetic layer 13 and the head, and the surface 13S of the magnetic layer 13 was not sufficiently in contact with the head. Furthermore, in Comparative Example 2, since the recessed portions 13A having a depth of 20% or more of the average thickness of the magnetic layer 13 were formed at a ratio of 230 per 1600 μm², the room temperature SNR deteriorated. Moreover, the SNR decreased significantly. It is considered that this is because the contact area between the surface 13S of the magnetic layer 13 and the head decreased due to the too high surface density of the recessed portions.

Figure 12A:
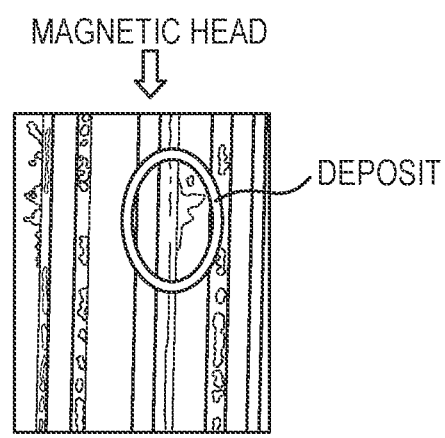
FIG. 12A is a schematic diagram for explaining a deposit on a magnetic head from a magnetic recording medium including a magnetic layer having relatively low viscoelasticity.

In Comparative Example 3, the binder of the magnetic layer 13 does not include a polyurethane-based resin. Furthermore, in Comparative Example 4, the weight of the vinyl chloride-based resin included in the binder of the magnetic layer 13 is sufficiently larger than the weight of the polyurethane-based resin. For this reason, minimum values of the logarithmic decay rate Δ obtained by the pendulum viscoelasticity test at a temperature of 10° C. or higher and 45° C. or lower were 0.015 and 0.018, respectively. As a result, the room temperature SNR deteriorated, and the SNR decreased significantly in both Comparative Examples. FIG. 12A illustrates a state around the magnetic head when the decrease in SNR in Comparative Examples 3 and 4 was measured. As illustrated in FIG. 12A, a constituent material of the magnetic layer 13 separated from the magnetic layer 13 is attached to a side of a region where the magnetic recording medium 10 is in contact with the magnetic head.

Figure 12B:
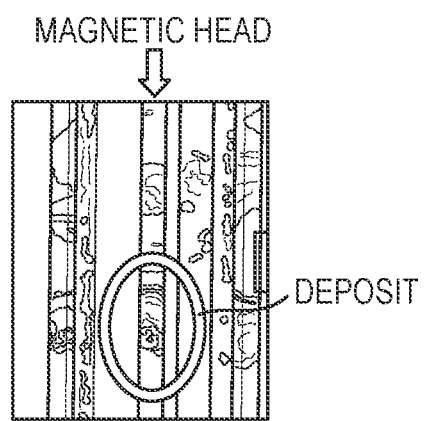
FIG. 12B is a schematic diagram for explaining a deposit on a magnetic head from a magnetic recording medium including a magnetic layer having relatively high viscoelasticity.

In Comparative Example 5, the weight of the vinyl chloride-based resin included in the binder of the magnetic layer 13 is sufficiently smaller than the weight of the polyurethane-based resin. For this reason, a minimum value of the logarithmic decay rate Δ obtained by the pendulum viscoelasticity test at a temperature of 10° C. or higher and 45° C. or lower was 0.040. As a result, the room temperature SNR deteriorated, and the SNR decreased significantly. FIG. 12B illustrates a state around the magnetic head when the decrease in SNR in Comparative Example 5 was measured. As illustrated in FIG. 12B, a highly viscous constituent material of the magnetic layer 13 separated from the magnetic layer 13 is attached to a surface of the magnetic head in contact with the magnetic recording medium 10.

In Comparative Examples 6 and 7, variations in the logarithmic decay rate Δ (differences between the maximum value and the minimum value) determined by the pendulum viscoelasticity test in the temperature range of 10° C. or higher and 45° C. or lower were 0.021 and 0.022, respectively. For this reason, the room temperature SNR was good, but the SNR decreased significantly. It is considered that this is because the shape change easily occurred at a high temperature, and the friction of the surface 13S of the magnetic layer 13 increased.

Although the present disclosure has been specifically described with reference to the embodiment and Modifications thereof, the present disclosure is not limited to the above-described embodiment and the like, and various modifications can be made.

For example, the configurations, the methods, the steps, the shapes, the materials, the numerical values, and the like exemplified in the embodiment described above and Modifications thereof are only examples, and a configuration, a method, a step, a shape, a material, a numerical value, and the like different therefrom may be used as necessary. Specifically, the magnetic recording medium of the present disclosure may include components other than the substrate, the base layer, the magnetic layer, the back layer, and the barrier layer. Furthermore, the chemical formulas of the compounds and the like are representative and are not limited to the described valences and the like as long as the compounds have common names of the same compound.

Furthermore, the configurations, the methods, the steps, the shapes, the materials, the numerical values, and the like in the embodiment described above and Modifications thereof can be combined to each other as long as not departing from the gist of the present disclosure.

Furthermore, within the numerical range described step by step here, an upper limit value or a lower limit value of a numerical range in one stage may be replaced with an upper limit value or a lower limit value of a numerical range in another stage. The materials exemplified here can be used singly or in combination of two or more thereof unless otherwise specified.

As described above, the magnetic recording medium cartridge according to an embodiment of the present disclosure can maintain good electromagnetic conversion characteristics even after the total thickness is reduced and repeated recording or repeated reproduction is executed.

Note that the effect of the present disclosure is not limited thereto, and may be any effect described here. Furthermore, the present technology can take the following configurations.

(1)

A tape-shaped magnetic recording medium including:
a substrate;
a base layer disposed on the substrate; and
a magnetic layer disposed on the base layer, in which
on a surface of the magnetic layer, recessed portions having a depth of 20% or more of the average thickness of the magnetic layer are formed at a ratio of 20 or more and 200 or less per 1600 $\mu m^2$,
on the surface of the magnetic layer, a logarithmic decay rate determined by a pendulum viscoelasticity test at a temperature of 10° C. higher and 45° C. or lower is 0.025 or more and 0.040 or less, a difference between a maximum value of the logarithmic decay rate and a minimum value of the logarithmic decay rate is 0 or more and 0.020 or less,
a squareness ratio in a perpendicular direction is 65% or more,
the magnetic layer has an average thickness of 80 nm or less, and
the magnetic recording medium has an average thickness of 5.6 μm or less.

(2)

The magnetic recording medium according to (1) described above, in which
the logarithmic decay rate is 0.025 or more and 0.035 or less.

(3)

The magnetic recording medium according to (1) described above, in which
the logarithmic decay rate is 0.025 or more and 0.030 or less.

(4)

The magnetic recording medium according to any one of (1) to (3) described above, in which
on a surface of the magnetic layer, the recessed portions are formed at a ratio of 40 or more and 200 or less per 1600 $\mu m^2$.

(5)

The magnetic recording medium according to any one of (1) to (4) described above, in which
on a surface of the magnetic layer, the recessed portions are formed at a ratio of 80 or more and 180 or less per 1600 $\mu m^2$.

(6)

The magnetic recording medium according to any one of (1) to (5) described above, in which
the substrate includes a polyester or a polyether ether ketone (PEEK) as a main component.

(7)

The magnetic recording medium according to any one of (1) to (6) described above, in which
the magnetic layer includes magnetic powder, and
the magnetic powder includes hexagonal ferrite including at least one of barium (Ba) and strontium (Sr), ε iron oxide, or cobalt (Co)-containing spinel type ferrite.

(8)

The magnetic recording medium according to any one of (1) to (7) described above, in which
the base layer and the magnetic layer each include a lubricant,
the lubricant includes at least one of a compound represented by the following general formula <1> and a compound represented by the following general formula <2>, and at least one of a compound represented by the following general formula <3> and a compound represented by the following general formula <4>.

$$CH_3(CH_2)_kCOOH \qquad <1>$$

(Provided that in general formula <1>, k is an integer selected from a range of 14 or more and 22 or less.)

$$CH_3(CH_2)_nCH=CH(CH_2)_mCOOH \qquad <2>$$

(Provided that in general formula <2>, the sum of n and m is an integer selected from a range of 12 or more and 20 or less, more preferably a range of 14 or more and 18 or less.)

$$CH_3(CH_2)_pCOO(CH_2)_qCH_3 \qquad <3>$$

(Provided that in general formula <3>, p is an integer selected from a range of 14 or more and 22 or less, more preferably a range of 14 or more and 18 or less, and q is an integer selected from a range of 2 or more and 5 or less, more preferably a range of 2 or more and 4 or less.)

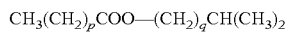   <4>

(Provided that in the general formula <2>, p is an integer selected from a range of 14 or more and 22 or less, and q is an integer selected from a range of 1 or more and 3 or less.)

(9)

The magnetic recording medium according to (8) described above, in which
the base layer has a large number of holes, and
the recesses of the magnetic layer are connected to the holes of the base layer.

(10)

A magnetic recording/reproducing device including:
a feeding unit that can sequentially feed out a tape-shaped magnetic recording medium;
a winding unit that can wind up the magnetic recording medium fed out from the feeding unit; and
a magnetic head that can write information on the magnetic recording medium and can read out information from the magnetic recording medium while being in contact with the magnetic recording medium traveling from the feeding unit toward the winding unit, in which
the magnetic recording medium includes:
a substrate;
a base layer disposed on the substrate; and
a magnetic layer disposed on the base layer,
on a surface of the magnetic layer, recessed portions having a depth of 20% or more of the average thickness of the magnetic layer are formed at a ratio of 20 or more and 200 or less per 1600 µm$^2$,
on the surface of the magnetic layer, a logarithmic decay rate determined by a pendulum viscoelasticity test at a temperature of 10° C. or higher and 45° C. or lower is 0.025 or more and 0.040 or less,
a difference between a maximum value of the logarithmic decay rate and a minimum value of the logarithmic decay rate is 0 or more and 0.020 or less,
a squareness ratio in a perpendicular direction is 65% or more,
the magnetic layer has an average thickness of 80 nm or less, and
the magnetic recording medium has an average thickness of 5.6 µm or less.

(11)

The magnetic recording/reproducing device according to claim 10, in which
a tension applied to the magnetic recording medium in a longitudinal direction thereof can be adjusted.

(12)

A magnetic recording medium cartridge including:
a tape-shaped magnetic recording medium; and
a casing that houses the magnetic recording medium, in which
the magnetic recording medium includes:
a substrate;
a base layer disposed on the substrate; and
a magnetic layer disposed on the base layer, in which
on a surface of the magnetic layer, recessed portions having a depth of 20% or more of the average thickness of the magnetic layer are formed at a ratio of 20 or more and 200 or less per 1600 µm$^2$, on the surface of the magnetic layer, a logarithmic decay rate determined by a pendulum viscoelasticity test at a temperature of 10° C. or higher and 45° C. or lower is 0.025 or more and 0.040 or less,
a difference between a maximum value of the logarithmic decay rate and a minimum value of the logarithmic decay rate is 0 or more and 0.020 or less,
a squareness ratio in a perpendicular direction is 65% or more,
the magnetic layer has an average thickness of 80 nm or less, and
the magnetic recording medium has an average thickness of 5.6 µm or less.

This application claims the benefit of priority based on Japanese Patent Application No. 2019-150696 filed on Aug. 20, 2019, the entire contents of which are incorporated herein by reference.

A person skilled in the art can conceive of various modifications, combinations, sub-combinations, and changes, in accordance with design requirements and other factors. It is understood that these modifications, combinations, sub-combinations, and changes are included in the appended claims and the scope of equivalents thereof.

The invention claimed is:
1. A tape-shaped magnetic recording medium comprising:
a substrate;
a base layer disposed on the substrate; and
a magnetic layer disposed on the base layer, wherein
on a surface of the magnetic layer, recesses having a depth of 20% or more of the average thickness of the magnetic layer are formed at a ratio of 20 or more and 200 or less per 1600 µm$^2$,
on the surface of the magnetic layer, a logarithmic decay rate determined by a pendulum viscoelasticity test at a temperature of 10° C. or higher and 45° C. or lower is 0.025 or more and 0.035 or less,
a difference between a maximum value of the logarithmic decay rate and a minimum value of the logarithmic decay rate is 0 or more and 0.020 or less,
a squareness ratio of the tape-shaped magnetic recording medium in a perpendicular direction is 65% or more,
the magnetic layer has an average thickness of 80 nm or less, and
the tape-shaped magnetic recording medium has an average thickness of 5.6 µm or less.

2. The tape-shaped magnetic recording medium according to claim 1, wherein
the logarithmic decay rate is 0.025 or more and 0.030 or less.

3. The tape-shaped magnetic recording medium according to claim 1, wherein
on a surface of the magnetic layer, the recesses are formed at a ratio of 40 or more and 200 or less per 1600 µm$^2$.

4. The tape-shaped magnetic recording medium according to claim 1, wherein
on a surface of the magnetic layer, the recesses are formed at a ratio of 80 or more and 180 or less per 1600 µm$^2$.

5. The tape-shaped magnetic recording medium according to claim 1, wherein
the substrate includes a polyester or a polyether ether ketone (PEEK) as a main component.

6. The tape-shaped magnetic recording medium according to claim 1, wherein
the magnetic layer includes magnetic powder, and
the magnetic powder includes hexagonal ferrite including at least one of barium (Ba) and strontium (Sr), ε iron oxide, or cobalt (Co)-containing spinel type ferrite.

7. The tape-shaped magnetic recording medium according to claim 1, wherein the base layer and the magnetic layer each include a lubricant, and the lubricant includes at least one of a compound represented by the following general formula <1> and a compound represented by the following general formula <2>, and at least one of a compound represented by the following general formula <3> and a compound represented by the following general formula <4>:

$CH_3(CH_2)_k COOH$ <1> where k is an integer selected from a range of 14 or more and 22 or less;

$CH_3(CH_2)_n CH=CH(CH_2)_m COOH$ <2> where a sum of n and m is an integer selected from a range of 12 or more and 20 or less;

$CH_3(CH_2)_p COO(CH_2)_q CH_3$ <3> where p is an integer selected from a range of 14 or more and 22 or less, and q is an integer selected from a range of 2 or more and 5 or less; and $CH_3(CH_2)_p COO-(CH_2)_q CH(CH_3)_2$ <4> where p is an integer selected from a range of 14 or more and 22 or less, and q is an integer selected from a range of 1 or more and 3 or less.

8. The tape-shaped magnetic recording medium according to claim 7, wherein the base layer has a large number of holes, and the recesses of the magnetic layer are connected to the holes of the base layer.

9. The tape-shaped magnetic recording medium according to claim 7, wherein, in formula <2>, the sum of n and m is an integer selected from a range of 14 or more and 18 or less.

10. The tape-shaped magnetic recording medium according to claim 7, wherein, in formula <3>, p is an integer selected from a range of 14 or more and 18 or less, and q is an integer selected from a range of 2 or more and 4 or less.

11. A magnetic recording/reproducing device comprising:

a feeding unit that can sequentially feed out a tape-shaped magnetic recording medium;

a winding unit that can wind up the tape-shaped magnetic recording medium fed out from the feeding unit; and a magnetic head that can write information on the tape-shaped magnetic recording medium and can read out information from the tape-shaped magnetic recording medium while being in contact with the tape-shaped magnetic recording medium traveling from the feeding unit toward the winding unit, wherein the tape-shaped magnetic recording medium includes:

a substrate;

a base layer disposed on the substrate; and a magnetic layer disposed on the base layer, on a surface of the magnetic layer, recesses having a depth of 20% or more of the average thickness of the magnetic layer are formed at a ratio of 20 or more and 200 or less per 1600 µm², on the surface of the magnetic layer, a logarithmic decay rate determined by a pendulum viscoelasticity test at a temperature of 10° C. or higher and 45° C. or lower is 0.025 or more and 0.035 or less, a difference between a maximum value of the logarithmic decay rate and a minimum value of the logarithmic decay rate is 0 or more and 0.020 or less, a squareness ratio of the tape-shaped magnetic recording medium in a perpendicular direction is 65% or more, the magnetic layer has an average thickness of 80 nm or less, and the tape-shaped magnetic recording medium has an average thickness of 5.6 µm or less.

12. The magnetic recording/reproducing device according to claim 11, wherein a tension applied to the tape-shaped magnetic recording medium in a longitudinal direction thereof can be adjusted.

13. A magnetic recording medium cartridge comprising:

a tape-shaped magnetic recording medium; and a casing that houses the tape-shaped magnetic recording medium, wherein the tape-shaped magnetic recording medium includes:

a substrate;

a base layer disposed on the substrate; and a magnetic layer disposed on the base layer, in which on a surface of the magnetic layer, recesses having a depth of 20% or more of the average thickness of the magnetic layer are formed at a ratio of 20 or more and 200 or less per 1600 µm², on the surface of the magnetic layer, a logarithmic decay rate determined by a pendulum viscoelasticity test at a temperature of 10° C. or higher and 45° C. or lower is 0.025 or more and 0.035 or less, a difference between a maximum value of the logarithmic decay rate and a minimum value of the logarithmic decay rate is 0 or more and 0.020 or less, a squareness ratio of the tape-shaped magnetic recording medium in a perpendicular direction is 65% or more, the magnetic layer has an average thickness of 80 nm or less, and the tape-shaped magnetic recording medium has an average thickness of 5.6 µm or less.

* * * * *